United States Patent Office 3,655,663
Patented Apr. 11, 1972

3,655,663
4-(3-SECONDARY AMINO-2-HYDROXY-PROXY) 1,2,5-THIADIAZOLES
Burton K. Wasson, 103 Broadview Ave., Valois, Quebec, Canada
No Drawing. Continuation-in-part of application Ser. No. 731,333, May 22, 1968. This application Apr. 21, 1969, Ser. No. 818,090
Int. Cl. C07d 87/46
U.S. Cl. 260—247.1      26 Claims

ABSTRACT OF THE DISCLOSURE

4-[3-(substituted amino)-2-hydroxypropoxy]-1,2,5-thiadiazole compounds, optionally substituted in the 3-position of the thiadiazole nucleus which exhibit β-adrenergic blocking properties and thus are useful in the management of angina pectoris are described. The products are prepared by one of four principal methods (1) reaction of a 4-hydroxy-1,2,5-thiadiazole with epihalohydrin to provide 4-(3-halo-2-hydroxypropoxy)-1,2,5-thiadiazole which, upon treatment with alkali, forms the epoxide which is then reacted with an amine to provide the desired product; (2) reaction of a 3-chloro(or bromo)-4-(3-substituted amino-2-hydroxypropoxy)-1,2,5-thiadiazole with an amine or an N-containing heterocycle that replaces the 3-chloro group; (3) reaction of 3-carboxy-4-allyloxy-1,2,5-thiadiazole with N-bromosuccinimide followed by esterification to give the alkyl ester of 3-carboxy-4-(3-bromo-2-hydroxypropoxy)-1,2,5-thiadiazole which upon treatment with an amine forms a 3-carbamoyl-4-(3-substituted amino-2-hydroxypropoxy)-1,2,5-thiadiazole and (4) reductive alkylation of an

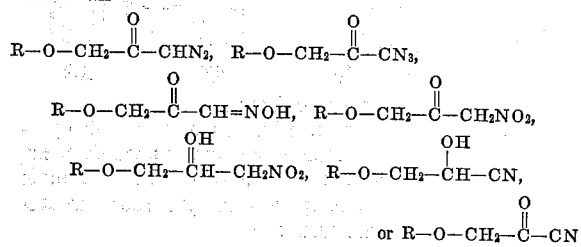

wherein R is the 1,2,5-thiadiazole-4-yl group.

This application is a continuation-in-part of copending application S.N. 731,333, filed May 22, 1968, now abandoned.

This invention is concerned with 4-[3-(substituted amino)-2-hydroxypropoxy]-1,2,5-thiadiazole compounds which are optionally substituted in the 3-position of the thiadiazole nucleus. These compounds exhibit β adrenergic blocking properties and have the marked advantages of having a long duration of action and being effective at very low dosage levels. Of particular interest are the 1,2,5-thiadiazole compounds having attached to the 4-position carbon a 3-(substituted amino)-2-hydroxypropoxy group wherein the hydroxy group may optionally be present in the form of an ester group and where the hydrogens attached to the propyl chain may optionally be replaced by lower alkyl substituents. Preferable, however, the 4-position substituent is the 3-(substituted amino)-2-hydroxypropoxy group. The compounds, particularly when additionally substituted in the 3-position of the 1,2,5-thiadiazole nucleus, exhibit especially desirable β-adrenergic blocking properties and generally, though not necessarily, those having a non-bulky substituent attached to the 3-position exhibit potent but short-acting β-adrenergic properties whereas those having a bulky substituent attached in this position generally exhibit potent and long-acting β-adrenergic blocking properties.

The novel β-adrenergic blocking agents of this invention have the structure

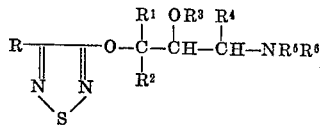

and parmacologically acceptable salts thereof, wherein R represents (1) hydrogen, (2) halogen, preferably chloro or bromo, (3) lower alkyl having from 1 to 5 carbon atoms and either a straight or branched chain such as methyl, ethyl, propyl, isopropyl, butyl, iso-, secondary- or tert-butyl and amyl including all of its branched chain configurations, (4) lower alkenyl having from 2 to 5 carbons such as vinyl, allyl, methallyl and the like, (5) a group having the structure Y—X—Z— wherein Y is a straight or branched chain alkyl having 1 to 4 carbons and optionally substituted with a phenyl group, or phenyl optionally substituted with one or more halogen atoms especially chloro, bromo, fluoro, hydroxy, lower alkyl $C_{1-3}$, and lower alkoxy $C_{1-3}$, X is oxygen or sulfur, and Z is alkyl having 1 or 2 carbons, (6) a carbamoyl group having the structure $R^{5\prime}$ HNCO wherein $R^{5\prime}$ is lower alkyl, having from 1 to 5 carbons, (7) cycloalkyl containing from 3 to 6 nuclear carbons such as cyclopropyl, cyclobutyl, cyclopentyl, cyclohexyl and the like, (8) a lower alkoxy having from 1 to 5 carbon atoms and being either a straight or branched chain and including methoxy, ethoxy, propoxy, isopropoxy, butoxy, and pentoxy, the latter groups existing in either straight or branched configuration, (9) phenyl or substituted phenyl wherein the substituents are selected from one or more halogen, preferably chloro or fluoro, lower alkyl having from 1 to 3 carbons, and lower alkoxy having from 1 to 3 carbons, (10) phenyl-lower alkyl wherein the lower alkyl moiety is either a straight or branched chain and has from 1 to 4 carbons and the phenyl moiety can be unsubstituted or substituted with one or more halogens, preferably chloro, fluoro, or bromo, lower alkyl having 1 to 3 carbons, or lower alkoxy having from 1 to 3 carbons, (11) an amino having the structure —$NR^7R^8$ wherein $R^7$ represents hydrogen, lower alkyl having from 1 to 4 carbons and hydroxy substituted lower alkyl having from 2 to 4 carbons, $R^8$ represents hydrogen, a lower alkyl having from 1 to 4 carbon atoms, hydroxy substituted lower alkyl and phenyl, or $R^7$ and $R^8$ can be joined together either directly to give a 3 to 7 membered ring with the nitrogen to which they are attached thereby forming aziridinyl, azetidinyl, pyrrolidyl, piperidyl, or a hexahydroazepinyl group, said 3 to 7 membered rings being either unsubstituted or substituted preferably with one or more lower alkyl having from 1 to 5 carbons or, hydroxy-lower alkyl of $C_{1-3}$, substituents, alternatively $R^7$ and $R^8$ can be joined through an oxygen, nitrogen or sulfur atom to form a 5 or 6 membered ring advantageously a morpholino, hexahydropyrimidyl, thiazolidinyl, p-thiazinyl, piperazinyl and the like group optionally substituted by lower alkyl $C_{1-3}$, (12) R additionally can be a 5 or 6 membered heterocyclic ring having oxygen, nitrogen or sulfur as the hetero atom and preferably the 2-furyl, 2- or 3-thienyl, 2-pyrryl and the o-, m- or p-pyridyl; $R^1$ is selected from hydrogen and lower alkyl having from 1 to 3 carbons; $R^2$ is selected from hydrogen and lower alkyl having from 1 to 3 carbons; $R^3$ is selected from hydrogen and benzoyl or lower alkanoyl wherein the alkanoyl group contains from 2 to 4 carbons; $R^4$ is selected from hydrogen and lower alkyl having from 1 to 3 carbons; $R^5$ represents hydrogen, lower alkyl having a straight or branched chain containing from 1 to 5 carbons, phenyl-lower alkyl wherein the alkyl moiety has from 1 to 3 carbons, and lower alkanoyl having from 2 to 5 carbons; $R^6$ represents (1) a straight or branched chain alkyl having from 1 up to about 20 carbons but preferably a branched chain alkyl having from 3 to 6 carbons such as isopropyl, tert-butyl, 2,2-dimethylpropyl and the like, (2) an unsaturated straight or branched chain alkyl as the alkenyl or alkinyl groups having preferably from 2 to 6 carbons, such as allyl, butynyl, propargyl and the like, said straight or branched chained, saturated or unsaturated alkyl optionally being substituted with one or more groups preferably selected from (a) hydroxy, (b) halogen especially chloro and bromo, (c) carboxyl or lower alkyl $(C_{1-3})$ ester thereof, (d) lower alkoxy or alkylthio where the alkyl moiety is straight or branched chain and contains from 1 to 4 carbons, (e) di-loweralkyl $(C_{1-3})$ amino wherein the alkyl groups optionally can be joined together either directly or through a hetero atom, particularly an oxygen, nitrogen or sulfur atom to form a heterocyclic group selected especially from pyrrolidinyl, piperazinyl, piperidinyl, morpholino, thiazolidinyl or thiazinyl group, each —N< group preferably being attached to an alkyl moiety having 1 to 8 carbons, (f) phenyl or phenoxy optionally substituted with from one to three similar or dissimilar groups selected from alkoxy $(C_{1-3})$, halogen (preferably chloro) or hydroxy, (g) a 5 to 6 membered heterocycle attached through a nuclear carbon and having oxygen, nitrogen or sulfur as the hetero atom such as a tetrahydrofuryl, furyl, thienyl, pyrrolidyl, piperidinyl and the like, (3) $R^6$ also can represent phenyl optionally substituted with lower-alkyl $(C_{1-3})$ or a 5 to 6 membered nitrogen-containing heterocycle as pyrrolidyl, piperidinyl and the like, (4) a cycloalkyl group having from 3 to 6 nuclear carbons, optionally lower alkyl $(C_{1-3})$ substituted such as the cyclopropyl, cyclopentyl, cyclohexyl, 2-methylcyclohexyl and the like, or having a heterocyclic substituent such as a 5 or 6 membered heterocycle containing nitrogen and oxygen as the hetero atom(s), (5) a 5 to 6 membered heterocycle having oxygen, nitrogen or sulfur as a hetero atom and being attached through a nuclear carbon, optionally lower alkyl $(C_{1-3})$ substituted or having a 5 or 6 membered heterocyclic substituent containing nitrogen and oxygen as the hetero atom(s) such as pyrrolidyl, 2-methylpyrrolidyl, morpholino, piperidino, pyridyl, morpholinopyridyl, piperizinyl-pyridyl, and the like; and when $R^5$ and $R^6$ separately represent lower alkyl or lower alkenyl they additionally can be joined together either directly or through one or two hetero atoms selected from oxygen, nitrogen and sulfur to form a 4 to 6 membered ring with the nitrogen to which they are attached which heterocycles can optionally be substituted with a lower alkyl $(C_{1-3})$ to form, for example, the pyrrolidyl, piperidino, morpholino, hexahydroazepinyl, pyrimidyl, p-thiazinyl, $\Delta^3$- or $\Delta^2$-piperideinyl, 1,2-dihydropyridyl and the like.

Suitable pharmacologically acceptable salts of product I are acid addition salts derived from inorganic acids, for example, hydrochlorides, hydrobromides, phosphates or sulfates or salts derived from organic acids, for example, oxalates, lactates, malates, maleates, formates, acetates, succinates, tartrates, salicylates, citrates, phenylacetates, benzoates, p-toluenesulfonates and other salts such as those that provide relatively insoluble products that afford a slow release of the active material, for example, a 1,1'-methylene-bis(2-hydroxy-3-naphthoate) and the like.

The novel 4 - [3-(substituted amino) - 2 - hydroxypropoxy]-1,2,5-thiadiazole compounds, structure I, as well as their intermediates which contain one asymmetric carbon atom in the propylene chain will be obtained as racemic compounds which can be separated into optically active isomers by known methods, for example, by forming a salt with an optically active acid, many of which are known to those skilled in the art, such as optically active tartaric, mandelic, cholic, O,O-di-p-toluoyl tartaric, O,O-dibenzoyl tartaric acids, or other acids conventionally employed for this purpose. Those novel products and intermediate compounds that contain two or more asymmetric carbons in the propylene chain will be obtained as diastereoisomers, and each diastereoisomer, of course, also will be obtained as a racemic compound which can be separated into its optically active isomers by known methods such as described above. Resolution of certain representative intermediate and end products will be described in the detailed examples. All products can be similarly resolved and the claims will be understood to embrace the products in the form of racemic compounds or diastereoisomers as well as in the form of the optically active isomers where appropriate.

While all of the compounds embraced by the above definition possess β-adrenergic blocking properties of the type discussed above, the products having structure I wherein $R^1$, $R^2$, $R^3$, $R^4$ and $R^5$ are hydrogen have been found to exhibit β-adrenergic blocking properties to a marked degree and within this subgroup of products those compounds wherein $R^6$ is a branched chain alkyl having 3 to 6 carbons preferably saturated and either unsubstituted or having a hydroxy or alkoxy substituent attached to the alkyl moiety as well as the branched chain lower alkynyl groups have been found to exhibit β-adrenergic blocking properties to a marked degree.

A preferred group of products therefore can be illustrated by the structure

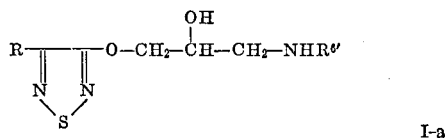

I-a wherein $R^{6'}$ has the more limited meaning given in the preceding paragraph.

Within each of the above discussed subgroups of products those wherein the 3-position substituent, R, is a non-bulky group such as hydrogen, halogen, lower alkyl, lower alkenyl and lower-alkoxy generally are short acting β-adrenergic blocking agents whereas when the substituent R is a more bulky substituent such as the cycloalkyl, phenyl, phenalkyl, or the —$NR^7R^8$ group and especially when $R^7$ and $R^8$ are joined together either directly or through an oxygen, nitrogen or sulfur atom to form a heterocyclic ring with the nitrogen to which they are attached or when R is a 5- to 6-membered heterocyclic ring of the type described above in item (12) of the definition of this variable, the products generally exhibit long-acting β-adrenergic blocking properties, and are substantially devoid of sympathomimetic properties.

Both the short-acting and long-acting β-adrenergic blocking agents are of value in therapy and each serves the need of certain patients requiring treatment with agents possessing this property.

The potential of a product as a β-adrenergic blocking agent conventionally is evaluated by the protocol which was employed to assess the β-blocking properties of the thiadiazole compounds of this invention. The protocol employed comprises intravenous administration of graded doses of the selected compound to rats which are then challenged with a standard dose of isoproterenol, a product known to be a β-stimulant. The $ED_{50}$ for representative products of this invention tested according to this protocol is included in certain of the examples that follow.

The clinical application of β-adrenergic blocking agents are well known to physicians. One use for the novel products of this invention, which constitutes the best mode for use of the products known to applicants at this time, is for the control of tachycardia that may be drug induced (as by isoproterenol) or brought about by physiological conditions. In view of the considerable amount of literature that has accumulated concerning the use of β-adrenergic blocking agents, physicians would employ the products of this invention in any of the known conditions where a short-acting or long-acting agent is needed, such as in the management of angina pectoris.

The products can be prepared in pharmaceutical formulations suitable for oral or parenteral administration preferably in the form of tablets, solutions, suspensions and emulsions. The 1,2,5-thiadiazoles can be formulated in the form of the free base or in the form of their salts in conjunction or admixture with organic and/or inorganic solid or liquid pharmaceutical excipients. No special probelms are involved in preparing suitable formulations of these products and methods generally employed for this purpose, which are known to those skilled in this art, are entirely suitable. If desired the compounds can be administered along with or formulated together with other active ingredients. Dosage units of from about 2 mg. to 10 mg. can be provided for the symptomatic adjustment of dosage by the physician depending upon the age and condition of the patient.

The novel thiadiazole products I of this invention can be prepared by one or more of the following routes:

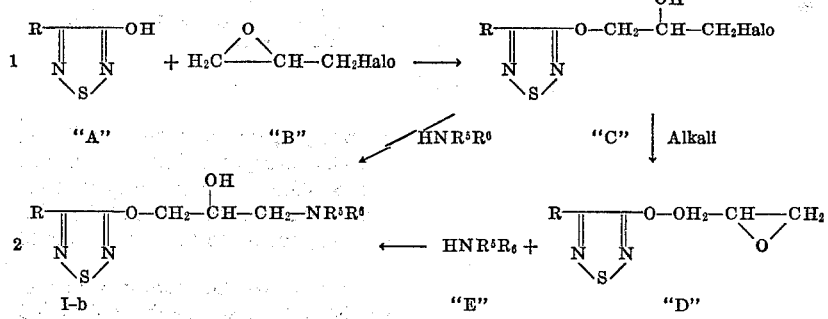

The 3-R-4-hydroxy-1,2,5-thiadiazole (A) is treated with epichlorhydrin or epibromhydrin (B) to provide product "C" which can be separated from the reaction mixture by extraction with ether. Ideally, the epihalohydrin is used in excess for its solvent properties and the reaction proceeds at room temperature or with heating up to about 90° C. with optimum results being obtained by heating at a temperature between about 55–70° C. The reaction of "A" and "B" is additionally facilitated by the presence of a trace of base which serves as a catalyst, preferred catalysts being piperidine, piperidine hydrochloride, pyridine or other heterocyclic bases. After extraction the intermediate product "C" is shaken with aqueous alkali to afford the epoxide (D). Aqueous sodium or potassium hydroxide are preferred at a concentration of about 20% for best yields. Treatment of the epoxide "D" with the amine "E" provides the desired thiadiazole product I–b. Advantageously an excess of the amine is employed for its solvent properties; from 3 to 5 moles of the amine being adequate to give very good yields of the desired product. Larger quantities of course can be employed if so desired. This step can be carried out at a temperature between about ambient temperature and 90° C. although it is preferred to use temperatures between about 60–70° C. It has also been found that certain amines, particularly branched chain monoalkyl amines, as neopentylamine, can be refluxed with the intermediate product "C" to give the desired product I–b directly.

When any one or more of the variables $R^1$, $R^2$ and $R^4$ is a lower alkyl, product I can be prepared by the reaction of starting substance "A" with an α-haloalkanoic acid of the structure.

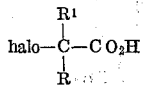

to provide 3-R-4-α-carboxyalkoxy - 1,2,5 - thiadiazole which is converted by conventional methods to the acid chloride. Reaction of the acid chloride with a diazoalkane of the structure $R^4CH$—$N_2$ gives the 3-R-4-(3-chloro-3-$R^4$-2-oxo-1-$R^1$-1-$R^2$ - propoxy) - 1,2,5 - thiadiazole which upon reduction, preferably with sodium borohydride, affords the intermediate "C," which is converted to the thiadiazole I–c by the procedures described above. This alternative method can, of course, be employed for preparing products wherein $R^1$, $R^2$ and $R^4$ are hydrogen.

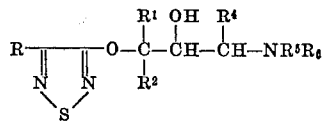

When $R^3$ of product I is benzoyl or lower alkanoyl, compound I–b or I–c is reacted with the described acid anhydride or chloride at ambient temperature or with brief warming up to about 100° C. whereupon a good yield of the desired product I is formed.

Many of the thiadiazole starting materials, "A," are known compounds or can be made from known starting materials. In general, the process for making the thiadiazoles "A" comprises the reaction of an

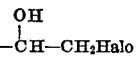

with ammonium hydroxide to provide the corresponding α-R-α-amino-acetamide hydrochloride which product, when reacted with $SCl_2$, $S_2Cl_2$, $SOCl_2$ or thionylaniline, provides the desired thiadiazole "A." It is sometimes more convenient to prepare the α-amino-acetamide product from an α-amino acid such as an

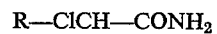

by treatment with acetyl chloride in methanol to form the ester which upon treatment with a large excess of ammonium hydroxide forms the desired α-amino-acetamide which then can be treated with $SCl_2$, $S_2Cl_2$, $SOCl_2$ or thionylaniline to provide the thiadiazole "A."

Another route by which novel compounds of this invention can be prepared can be illustrated as follows:

ROUTE II

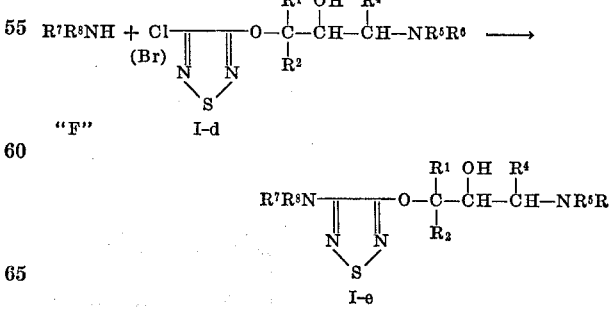

In the second route, treatment of the thiadiazole, I–d (prepared by the method described in Route I) with an amine, "F," affords the appropriately 3-substituted product I–e. When the amine "F" is a primary or secondary amine, the reaction advantageously is carried out under pressure; however, when the amine is a heterocycle of the type defined hereinabove the reaction readily takes place without pressure by heating the reactants at a temperature between about 100–150° C. but preferably at a temperature between about 125–135° C. A slight excess of the amine "F" generally is used for its solvent properties and from about 3 to 5 moles of amine have been found to give optimum yields. Larger quantities can, of course be employed, if desired.

Various modifications can be made in the above preferred methods for preparing the products of this invention. For example, when starting material "A" in Route I is the 3-chloro(or bromo)-4-hydroxy-1,2,5-thiadiazole, it can be reacted with product "F" (see Route II) thereby introducing the desired —$NR^7R^8$ group in the 3-position of the thiadiazole nucleus. Also, when R in product "D" (see Route I) is chloro or bromo, product "D" can be reacted with the amine "F" whereupon the amine will first react with the epoxide portion of the product and then, by increasing the temperature, it will replace the chloro or bromo group thereby forming a product of the structure:

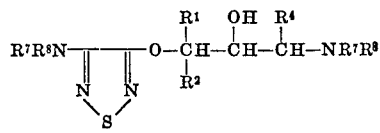

Obviously an amine of the structure $HNR^5R^6$ could be used in place of reactant "F." As is usual, the amine is employed in excess for its solvent properties and the second state of the reaction advantageously is carried out at a temperature from between about 110–150° C. although preferably at between about 125–135° C. to introduce the amino group into the 3-position. In some instances it may be advantageous to carry out this reaction in a sealed vessel.

A third route, especially useful in preparing 3-carbamoyl substituted products, can be illustrated as follows:

ROUTE III

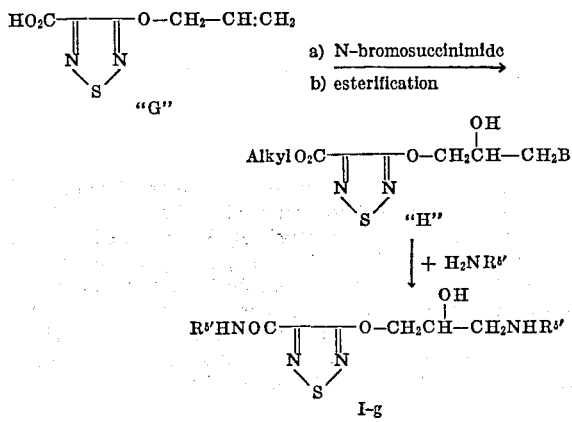

Route III is especially designed to prepare products having a carbamoyl substituent in the 3-position. Treatment of the 4-allyloxy-1,2,5-thiadiazole-3-carboxylic acid "G" with N-bromosuccinimide followed by esterification gives the bromohydrin "H." An aqueous solution of N-bromosuccinimide advantageously is employed and reaction takes place at about ambient temperature. As the reaction is exothermic, the reaction mixture is cooled to maintain the temperature from slightly below to slightly above ambient temperature for best results. Esterification can be effected with any alcohol, advantageously methanol or other lower alkanols having advantageously from 1 to 4 carbons or a phenyl-lower alkanol such as, for example, phenylethanol, and the reaction temperature preferably is maintained at a range from below to slightly above ambient temperature, such as in the range from about 10 to 30° C. The bromohydrin "H" which is obtained in good yields, then is condensed with an amine of the structure $H_2NH^{5'}$ to form the thiadiazole product I-g. The reaction with the amine advantageously is carried out at reflux or if desired it can be carried out under pressure at higher temperatures. The amine generally is used in excess for its solvent properties.

A fourth route for preparing the novel products of this invention comprises forming the substituted amino group in situ by reductive alkylation illustrated by the following scheme:

ROUTE IV

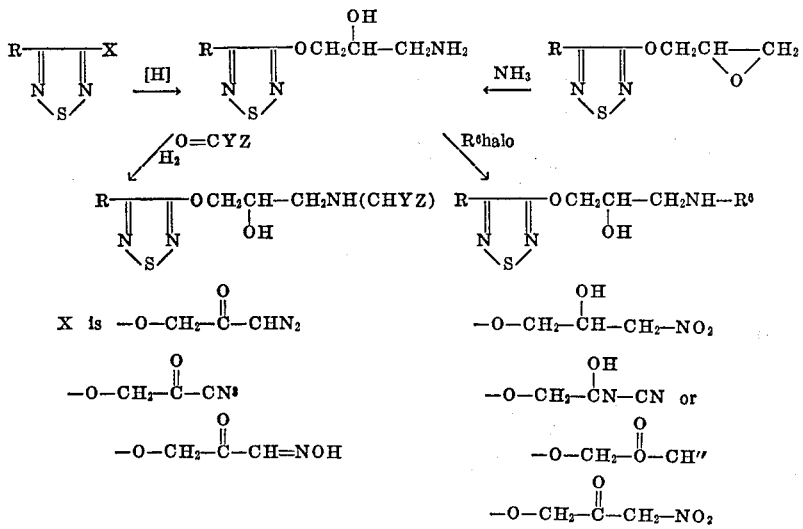

Y is preferably a saturated or unsaturated lower alkyl ($C_{1-5}$), hydroxy-lower alkyl ($C_{2-5}$), lower cycloalkyl ($C_{3-6}$) or phenyl;

Z is lower alkyl ($C_{1-5}$), and when

Y and Z are each lower alkyl they can be linked together to form a 3- to 6-membered carbocyclic ring with the carbon to which they are attached;

R has the meaning hereinbefore assigned.

As catalyst, palladium on charcoal or lithium aluminum hydride as reducing agent, advantageously is employed.

The following examples will illustrate representative products of this invention prepared by the above described procedures. It will be understood that these compounds can be prepared by either Route I or Route II or a combination or modification of these routes as described above although the 3-carbamoyl compounds preferably are prepared by Route III. The following examples therefore are not to be considered as limiting the preparation of any particular compound to the method described in the example as the examples are provided solely to illustrate the best modes currently known to applicants for the prepartion of the novel thiadiazoles of this invention.

EXAMPLE 1

3-chloro-4-(3-tert-butylamino-2-hydroxy-propoxy)-1,2,5-thiadiazole

STEP A: PREPARATION OF 3-CHLORO-4-(2,3-EPOXY-PROPOXY)-1,2,5-THIADIAZOLE

A mixture of 30 g. (0.22 mole) of 3-chloro-4-hydroxy-1,2,5-thiadizole, 71 g. (0.77 mole) of epichloro-hydrin, and 0.6 ml. of piperidine is maintained at 65–70° C. for two hours. Excess epichlorohydrin is removed at about 95° C. using water-pump vacuum. The residual viscous gum, 55.5 g., is dissolved in diethyl ether and refrigerated. The supernatant ethereal liquor is drawn off and evaporated to dryness giving 20.2 g. of a viscous oil that is then stirred for about one-half hour with 150 ml. of 10% sodium hydroxide solution. The mixture warms up slightly during this treatment. The mixture then is extracted with diethyl ether, washed with water, and evaporated to yield 20.2 g. of crude 3-chloro-4-(2,3-epoxypropoxy)-1,2,5-thiadiazole.

STEP B: PREPARATION OF 3-CHLORO-4-(3-TERT-BUTYLAMINO-2-HYDROXYPROPOXY)-1,2,5-THIADIAZOLE HYDROCHLORIDE

A mixture of 40.2 g. (0.21 mole) of 3-chloro-4-(2,3-epoxypropoxy)-1,2,5-thiadiazole and 76 g. (1.05 moles) of tert-butylamine is heated and stirred at 60–70° C. for two and one-half hours. Excess tert-butylamine is removed in vacuo giving 42.4 g. of residual crude product. The latter is dissolved by shaking with a mixture of diethyl ether and water containing 2.5 g. of sodium hydroxide. The ethereal phase is separated and the aqueous phase is extracted with several portions of diethyl ether. The ethereal extracts are combined, washed with small volumes of water and then treated with excess 3 N hydrochloric acid. The aqueous layer is separated, evaporated to dryness, and the resulting residue is dried by azeotropic distillation of benzene ethanol. The crystalline solid is recrystallized from ethanol diethyl ether giving 31.3 g. (49.5%) of 3-chloro-4-(3-tert-butylamino-2-hydroxypropoxy) - 1,2,5 - thiadiazole hydrochloride, M.P. 159–161° C. Recrystallizations from the same solvent mixture gives product melting at 161–163° C. ($ED_{50}$=0.093 mg./kg.).

*Analysis.*—Calculated for $C_9H_{17}Cl_2N_3O_2S$ (percent): C, 35.77; H, 5.67; Cl, 23.46; N, 13.90. Found (percent): C, 36.11; H, 5.37; Cl, 23.33; N, 13.82.

STEP C: PREPARATION OF 3-CHLORO-4-(3-TERT-BUTYLAMINO-2-HYDROXYPROPOXY)-1,2,5-THIADIAZOLE

The 3-chloro-4-(3-tert-butylamino-2-hydroxypropoxy)-1,2,5-thiadiazole hydrochloride obtained in Step B is neutralized with aqueous sodium carbonate and the free base extracted with diethyl ether. After removal of the solvent, the residue is recrystallized from di-isopropyl ether giving the free base as colorless prisms, M.P. 78–79° C.

*Analysis.*—Calculated for $C_9H_{16}ClN_3O_2S$ (percent): C, 40.66; H, 6.07; Cl. 13.34; N, 15.81; S, 12.07. Found (percent): C, 40.80; H, 6.18; Cl, 13.80; N, 16.00 S, 11.80.

In the following sections describing methods of resolving certain of the racemic products of this invention, no attempt has been made to assign an absolute configuration to the compounds. The (—)- and (+)-isomers of the resolving agents refer to the optical rotation of the parent (—) or (+) agent employed. All (—) and (+) values given throughout for the compounds refer to the actual rotation of the free base, i.e., in referring to the levorotatory salt (+) - 3 - morpholino-4-(3-tert-butylamino-2-hydroxypropoxy-1,2,5 - thiadiazole hydrogen maleate, the (+)- sign refers to the sign of rotation of the free base, (+)-3-morpholino-4-(3-tert-butylamino - 2 - hydroxypropoxy) - 1,2,5 - thiadiazole hydrogen maleate, the (+) sign refers to the sign of rotation of the free base (+)-3-morpholino-4-(3-tert-butylamino-2-hydroxypropoxy)-1,2,5-thiadiazole.

RESOLUTION OF EXAMPLE 1 PRODUCT

Section 1.—Isolation of (+)-3-chloro-4-(3-tert-butylamino - 2 - hydroxypropoxy) - 1,2,5 - thiadiazole via the O,O-di-p-toluoyl-(—)-tartrate Step A: A warmed solution of 26.5 g. (0.1 mole) of racemic 3-chloro - 4 - (3-tert-butylamino-2-hydroxypropxoy)-1,2,5-thiadiazole from Example 1, Step C, in 100 ml. of ethanol is added to a warmed solution of 38.6 g. (0.1 mole) of O,O-di-p-toluoyl-(—)-tartaric acid in 225 ml. of ethanol and the mixture left overnight at 5° C. The precipitated solid is collected, washed with 25 ml. of ethanol and dried to give 49.8 g. of crystalline product, M.P. 160–2° C. (dec.), ($[\alpha]_D^{22°}$+77.5°, c.=2.9 in $CH_3OH$)[1]. The crude salt is recrystallized five times from five volumes by weight of ethanol affording 21.0 g. of enriched (+) - 3-chloro-4-(3-tert-butylamino-2-hydroxypropoxy) - 1,2,5-thiadiazole hydrogen O,O-di-p-toluoyl-(—)-tartrate, M.P. 66.5–7.0° C. (dec.), ($[\alpha]_D^{22°}$+80.6°. c.=2.5 in $CH_3OH$).

Step B: The above salt (21.0 g., 0.0323 mole) is shaken with a mixture of 100 ml. of water, 14 ml. (0.07 mole) of 5 N sodium hydroxide solution, and 100 ml. of diethyl ether. Two further ether extractions (2× 50 ml.) are performed and the combined ethereal extract is extracted once with 30 ml. (ca. 0.04 mole) of 1.38 N hydrochloric acid. The acid layer is extracted once with a small amount of diethyl ether, and then basified with 10 ml. (0.05 mole) of 5 N sodium hydroxide solution. The liberated base is extracted with 100 ml. of diethyl ether, followed by two 25 ml. portions of ether. The ethereal extracts are combined and washed with 20 ml. (2× 10 ml.) of water, dried over anhydrous magnesium sulfate and evaporated to dryness under reduced pressure to give 7.9 g. of syrupy (+)-3-chloro-4-(3-tert-butylamino-2-hydroxypropoxy)-1,2,5-thiadiazole ($[\alpha]_D^{20°}$+6.5°, c.=2.4 in $CH_3OH$). The syrup (7.9 g.) is dissolved in 115 ml. of warm "Skellysolve B" (essentially, n-hexane, B. 60–68°) the solution allowed to cool to room temperature, seeded with a trace of racemic base, and left 18 hours at room temperature. The crystalline solids are collected, washed with a small volume of "Skellysolve B," and dried to give 0.92 g. of (±)-3-chloro-4-(3-tert-butylamino-2-hydroxypropoxy) - 1,2,5 - thiadiazole contaminated with a small amount of the (+)-enantiomer, M.P. 59–68° C. The filtrate afforded 5.6 g. of (+)-3-chloro-4-(3-tert-butylamino-2-hydroxypropoxy) - 1,2,5 - thiadiazole, M.P. 58.5–62.5° C. ($[\alpha]_D^{20°}$+6.7°, c.=2.5 in $CH_3OH$). Further crystallization of the latter from "Skellysolve B" afforded the product melting at 58.5–60.0° C., $[\alpha]_D^{20°}$+7.22°, c=2.5 in $CH_3OH$) ($ED_{50}$=0.023 mg./kg. tested as HCl salt).

*Analysis.*—Calculated for $C_9H_{16}ClN_3O_2S$ (percent): C, 40.68; H, 6.07; Cl, 13.34; N, 15.81; S, 12.06. Found (percent): C, 41.15; H, 6.08; Cl, 13.76; N, 16.13; S, 12.04.

Section 2.—Preparation of (+)-3-chloro-4-(3-tert-butylamino-2-hydroxypropoxy) - 1,2,5 - thiadiazole hydrochloride A solution of (+)-3-chloro-4-(3-tert-butylamino-2-hydroxypropoxy)-1,2,5-thiadiazole (1.45 g., M.P. 59–60° C.) in 20 ml. of anhydrous diethyl ether is treated with an excess of ethanolic hydrogen chloride solution. The precipitated solid is collected and washed with anhydrous diethyl ether to give 1.43 g. of (+)-3-chloro-4-(3-tert-butylamino-2-hydroxypropoxy) - 1,2,5-thiadiazole hydrochloride, M.P. 148–51° C. Precipitation of this material

---

[1] The legends employed here and throughout the specification have the following significance. "$[\alpha]^{22}$+77.5" signifies the specific rotation at 22° C. (or other given temperature), at the "D" line of sodium. "c.=2.9 in $CH_3OH$" signifies the concentration of the product (2.9% or other given concentration) in methanol (or other specified solvent).

in ethanol with diethyl ether affords the product with M.P. 148–9.5° C., ([α]$_D^{22°}$ −7.65°, c.=2.75 in CH$_3$OH).

Analysis.—Calculated for C$_9$H$_{16}$ClN$_3$O$_2$S.HCl (percent): C, 35.77; H, 5.67; Cl, 23.46; N, 13.90; S, 10.60. Found (percent): C, 35.88; H, 5.74; Cl, 23.61; N, 14.06; S, 10.34.

Section 3.—Isolation of (−)-3-chloro-4-(3-tert-butylamino-2-hydroxypropoxy)-1,2,5-thiadiazole All liquors and washes resulting from the isolation of (+)-3-chloro-4-(3-tert-butylamino-2 - hydroxypropoxyl)-1,2,5-thiadiazole hydrogen O,O-di-p-toluoyl-(−)-tartrate (see Section 1) are combined, evaporated to dryness, and the residue treated with 5 N sodium hydroxide solution as described in Section 1. The mixture then is extracted three times with diethyl ether. The combined ethereal extracts are washed with water, dried, and evaporated to dryness to give 14.3 g. of enriched (−)-3-chloro-4-(3-tert-butylamino-2-hydroxypropoxy) - 1,2,5 - thiadiazole, M.P. 58–76° C. The crude material (14.3 g.) is dissolved in 210 ml. of "Skellysolve B," allowed to cool to room temperature, seeded with a trace of racemic base, and left at room temperature for 24 hours. The crystals are collected and dried to give 5.9 g. of (±)-3-chloro-4-(3-tert-butylamino-2-hydroxypropoxyl) - 1,2,5 - thiadiazole, M.P. 78.5–9.5° C. ([α]$_D^{20°}$ 0°); and themother liquors afford further crops of crystalline racemic material. The remaining mother liquors upon evaporation then affords a total of 6.9 g. of (−)-3-chloro-4-(3-tert-butylamino-2-hydroxypropoxyl)-1,2,5-thiadiazole, M.P. 57–60° C., ([α]$_D^{22°}$ −7.31°, c.=2.5 in CH$_3$OH). Further purification gives (−)-3-chloro-4-(3-tert-butylamino-2-hydroxypropoxy)-1,2,5-thiadiazole, M.P. 59–60° C., (ED$_{50}$=0.056 mg./kg., tested as hydrochloride salt.)

Analysis.—Calculated for C$_9$H$_{16}$ClN$_3$O$_2$S (percent): C, 40.68; H, 6.07; Cl, 13.34; N, 15.81; S, 12.06. Found (percent): C, 40.46; H, 6.21; Cl, 13.31; N, 15.96; S, 11.90.

Section 4.—Preparation of (−)-3-chloro-4-(3-tert-butylamino-2-hydroxypropoxy)-1,2,5-thiadiazole hydrochloride A slight excess of ethanolic hydrogen chloride solution is added slowly to a stirred solution of (−)-3-chloro-4-(3-tert-butylamino-2-hydroxypropoxy)-1,2,5 - thiadiazole (1.66 g., 6.26 millimoles, M.P. 59–60° C., obtained as in Section 3) in 50 ml. of dry diethyl ether. The resulting precipitated solid is collected, washed with anhydrous diethyl ether, and dried to give 1.8 g. of (−)-3-chloro-4-(3-tert-butylamino-2-hydroxypropoxy) - 1,2,5 - thiadiazole hydrochloride, M.P. 146–7° C. ([α]$_D^{20°}$+7.9°, c.=2.8 in CH$_3$OH).

Section 5.—Isolation of (−)-3-chloro-4-(3-tert-btuylamino-2-hydroxypropoxy)-1,2,5-thiadiazole Step A: The procedure set forth in Section 1 is repeated with the exception that O,O-di-p-toluoyl-(−)-tartaric acid is replaced by O,O-di-p-toluoyl)-(+)-tartaric acid. Thus solutions of 25.75 g. (0.0972 mole) of (±)-3-chloro-4-(3-tert-butylamino-2-hydroxypropoxy) - 1,2,5 - thiadiazole in 100 ml. of anhydrous ethanol and 37.5 g. (0.0972 mole) of O,O-di-p-toluoyl)-(+)-tartaric acid in 225 ml. of anhydrous ethanol are mixed and chilled for two hours at 5° C. to give 49.1 g. (77.6%) of the salt, M.P. 159–61° C. The crystalline product is recrystallized five times from anhydrous ethanol to give 24 g. of highly enriched (−)-3-chloro-4-(3-tert-butylamino-2 - hydroxypropoxy)-1,2,5-thiadiazole hydrogen O,O-di-p-toluoyl-(+)-tartrate, M.P. 165–6° C. ([α]$_D^{22°}$−80.1°, c.=3 in CH$_3$OH).

Analysis. — Calculated for C$_9$H$_{16}$ClN$_3$O$_2$S.C$_{20}$H$_{18}$O$_8$ (percent): C, 53.3; H, 5.25; Cl, 5.44; N, 6.44; S, 4.91. Found (percent): C, 53.1; H, 4.99; Cl, 5.86; N, 6.94; S, 4.93.

Step B: The procedure set forth in Step B of Section 1, is followed for the treatment of the salt to afford the free base. Thus treatment of (−)-3-chloro-4-(3-tert-butylamino-2-hydroxypropoxy)-1,2,5-thiadiazole hydrogen O,O-di-p-toluoyl-(+)-tartrate, followed by extraction with diethyl ether, gave a free base that upon fractional crystallization from "Skellysolve B" to remove small amounts of racemic base affords 7 g. of (−)-3-chloro-4-(3-tert-butylamino-2-hydroxypropoxy)-1,2,5 - thiadiazole, M.P. 59–60° C.

Analysis.—Calculated for C$_9$H$_{16}$ClN$_3$O$_2$S (percent): C, 40.68; H, 6.07; Cl, 13.34; N, 15.81; S, 12.06. Found (percent): C, 40.50; H, 6.21; Cl, 13.30; N, 16.00; S, 11.90.

Section 6.—Isolation of (+)-3-chloro-4-(3-tert-butylamino-2-hydroxypropoxy)-1,2,5-thiadiazole Following the procedure of Section 3, the mother liquors and washings from the isolation of (−)-3-chloro-4-(3-tert-butylamino-2 - hydroxypropoxy) - 1,2,5 - thiadiazole hydrogen O,O-di-p-toluoyl-(+)-tartrate (from Step A, Section 5) are treated with alkali, the free organic base extracted with diethyl ether, and the ether removed to afford the free base enriched with (+)-3-chloro-4-(3-tert-butylamino-2-hydroxypropoxy) - 1,2,5 - thiadiazole. Careful fractional crystallization of this crude base from "Skellysolve B" removes (±) -3-chloro-4-(3-tert-butylamino-2-hydroxypropoxy)-1,2,5-thiadiazole, M.P. 78–9° C. The remaining fractions are combined and recrystallized to afford (+)-3-chloro-4-(3-tert-butylamino-2-hydroxypropoxy)-1,2,5-thiadiazole, M.P. 59–60° C.

Section 7.—Isolation of (−)-3-chloro-4-(3-tert-butylamino-2-hydroxypropoxy)-1,2,5-thiadiazole The procedure set forth in Section 1 is repeated with the exception that O,O-di-p-toluoyl-(−)-tartaric acid is replaced by (−)-tartaric acid. The resulting salt is recrystallized repeatedly from ethanol to give di-[(+)-3-chloro - 4 - (3-tert-butylamino-2-hydroxypropoxy)-1,2,5-thiadiazole]-(−)-tartrate, M.P. 130–2° C. ([α]$_D^{22°}$− 15.3°, c.=2.6 in CH$_3$OH). The tartrate is converted by the method described in Step B of Section 1 to the free base and the base subjected to fractional crystallization to afford (+) - 3-chloro-4-(3-tert-butylamino-2-hydroxypropoxy)-1,2,5-thiadiazole. Work up of the washings and mother liquors from di-[(+)-3-chloro-4-(3-tert-butylamino - 2 - hydroxypropoxy) - 1,2,5-thiadiazole]-(−)-tartrate by the procedure given in Section 3 affords (−)-3 - chloro-4-(3-tert-butylamino-2-hydroxypropoxy)-1,2,5-thiadiazole.

Section 8.—Isolation of (+)-3-chloro-4-(3-tert-butylamino-2-hydroxypropoxy)-1,2,5-thiadiazole Step A: The procedure set forth in Section 1 is repeated with the exceptions that O,O-di-p-toluoyl-(−)-tartaric acid is replaced by (+)-tartaric acid. The resulting salt upon repeated recrystallization affords di-[(−)-3-chloro - 4 - (3-tert-butylamino-2-hydroxypropoxy)-1,2,5-thiadiazole]-(+)-tartrate, M.P. 130–2° C.

([α]$_D^{22°}$+15.6° c.=2.3 in CH$_3$OH).

Analysis.—Calculated for C$_9$H$_{16}$ClN$_3$O$_2$S)$_2$·C$_4$H$_6$O$_6$ (percent): C, 38.7; H, 6.51; Cl, 10.4; N, 12.3; S, 9.39. Found (percent): C, 38.5; H, 5.70; Cl, 10.7; N, 12.2; S, 9.18.

Step B: The tartrate is converted by the procedure of Section 1, Step B, to the free base and the base recrystallized to afford (−)-3-chloro-4-(3-tert-butylamino-2-hydroxypropoxy)-1,2,5-thiadiazole, M.P. 58–60° C.

Step C: Work up of the mother liquors and washings from di-[(−) - 3-chloro-4-(3-tert-butylamino-2-hydroxypropoxy) - 1,2,5-thiadiazole]-(+)-tartrate by the procedure described in Section 3 affords (+)-3-chloro-4-(3-tert-butylamino-2-hydroxypropoxy)-1,2,5-thiadiazole.

Section 9.—Isolation of (−) and (+)-3-chloro-4-(3-tert-butylamino - 2-hydroxypropoxy)-1,2,5-thiadiazole via O,O-dibenzoyl-(+)-tartaric acid Step A: The procedure set forth in Section 1 is repeated with the exception that O,O-di-p-toluoyl-(−)-tartaric acid is replaced by O,O-dibenzoyl-(+)-tartaric acid. Thus, solutions of 5.3 g. (0.02 mole) of (±)-3-chloro-4-(3 - tert-butylamino-2-hydroxypropoxy)-1,2,5-thiadiazole in 20 ml. of anhydrous ethanol and 7.5 g. (0.02 mole) of O,O-dibenzoyl-(+)-tartaric acid in 45 ml. of anhydrous ethanol are mixed and left two days at room temperature to give 1.7 g. of product, M.P. 177–8° C. ($[\alpha]_D^{20°}$ −42.9°, c.=1.55 in $CH_3OH$). Recrystallization of this material from anhydrous ethanol gave 1.35 g. of di-[(−) - 3 - chloro - 4 - (3-tert-butylamino-2-hydroxypropoxy)-1,2,5-thiadiazole] - O,O - dibenzoyl-(+)-tartrate, M.P. 177.7–178.2 C. (dec.). ($[\alpha]_D^{20°}$ −44.6°, c.=1.24 in $CH_3OH$).

Step B: The salt is partitioned between 50 ml of diethyl ether and 50 ml. of water containing 1 g. of sodium carbonate, the layers are separated after vigorous shaking and the aqueous phase extracted four times with diethyl ether. The combined ethereal extracts are washed with water and evaporated to give the free base. This product is recrystallized from "Skellysolve B" to give 600 mg. of (−) - 3-chloro-4-(3-tert-butylamino-2-hydroxy-propoxy) - 1,2,5 - thiadiazole, M.P. 59.5–60.5° C. ($[\alpha]_D^{20°}$ −7.16°, c.=3.5 in $CH_3OH$). Work-up of the mother liquors from the dibenzoyl tartrate by the procedure of Section 3 affords (+)-3-chloro-4-(3-tert-butylamino-2-hydroxypropoxy)-1,2,5-thiadiazole, M.P. 59–60° C.

Section 10.—Isolation of (−) and (+)-3-chloro-4-(3-tert-butylamino - 2-hydroxypropoxy)-1,2,5-thiadiazole via O,O-dibenzoyl-(+)-tartaric acid Similarly, following the procedure set forth in Section 1 with the exception that the O,O-di-p-toluoyl-(−)-tartaric acid is replaced with O,O-dibenzoyl-(+)-tartaric acid there is obtained specimens of (−)- and (+)-3-chloro - 4-(3-tert-butylamino-2-hydroxypropoxy)-1,2,5-thiadiazole.

EXAMPLE 1A 3-morpholino-4-(3-tert-butylamino-2-hydroxypropoxy)-1,2,5-thiadiazole hydrogen maleate A solution of 5.0 g. of 3-hydroxy-4-morpholino-1,2,5-thiadiazole (26.7 mmole) in 18.95 ml. of 1.41 N methanolic sodium methoxide is treated with 10.5 ml. of epichlorohydrin (134 mmole) and the mixture is stirred at 25° C. for 16 hours. The precipitated sodium chloride is filtered and washed with methanol. The filtrate is evaporated in vacuo to an oil residue. The residue is refluxed for 12 hours in 15 ml. t-butylamine and the excess amine evaporated in vacuo. The residue of crude 3-morpholino - 4-(3-tert-butylamino-2-hydroxypropoxy)-1,2,5-thiadiazole free base (6.1 g.) is converted to the maleate salt and recrystalized from ethanol, M.P. 214–215° C.

EXAMPLE 1B 3-morpholino-4-(3-tert-butylamino-2-hydroxypropoxy)-1,2,5-thiadiazole, hydrogen maleate A mixture of 0.22 mole of 3-morpholino-4-hydroxy-1,2,5-thiadiazole, 71 g. (0.77 mole) of epichlorohydrin, and 0.6 ml. of piperidine is maintained at 65–70° C. for 2 hours. Excess epichlorohydrin is removed at about 95° C. in vacuo. The residual gum is dissolved in diethyl ether and refrigerated. The supernatant ethereal liquor is separated and evaporated to a viscous oil. An excess of t-butylamine is added and the mixture is heated at 100° C. for 10 hours in a sealed vessel. The product is isolated by the method described in Example 1A to 3-morpholino-4-(3 - tert-butylamino-2-hydroxypropoxy)-1,2,5-thiadiazole, hydrogen maleate.

By following substantially the same procedure described in Example 1, 1A or 1B but replacing the 3-chloro-4-hydroxy-1,2,5-thiadiazole in Example 1, Step A, and the amine employed in Example 1, Step B by the reactants "A" and "E" identified in the following table there are obtained thiadiazoles I–b which also are identified in Table I. The groups identified for the variable radicals R, $R^5$ and $R^6$ in the reagents "A" and "E" remain unchanged during the reaction and are the same R, $R^5$ and $R^6$ groups in the thiadiazole products I–b.

TABLE I

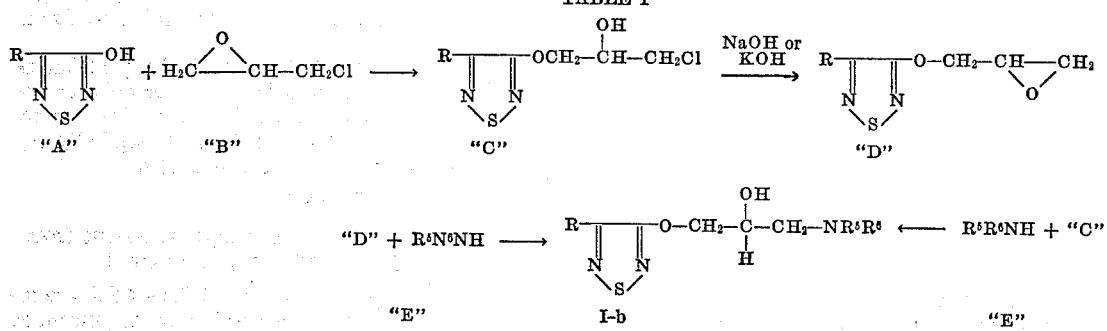

| Ex. No. | R | $R^5$ | $R^6$ | Empirical formula | Melting point in °C. | Calculated C | H | Cl | N | Found C | H | Cl | N | $ED_{50}$, mg./kg. |
|---|---|---|---|---|---|---|---|---|---|---|---|---|---|---|
| 2 | H | H | —C(CH$_3$)$_2$CH$_2$OH | C$_9$H$_{17}$N$_3$OS | 94–6 | 43.70 | 6.93 | | 16.99 | 43.21 | 7.13 | | 16.66 | 4.8 |
| 3 | H | —(CH$_2$)$_2$—O—(CH$_2$)$_2$— | | C$_9$H$_{15}$N$_3$O$_3$.HCl | 150–2 | 38.86 | 5.72 | 12.58 | 14.91 | 38.55 | 6.02 | 12.78 | 14.88 | 3.1 |
| 4 | Cl | H | —CH(CH$_3$)$_2$ | C$_8$H$_{14}$ClN$_3$O$_2$S.HCl | 153–5 | 32.65 | 5.25 | 24.60 | 14.58 | 33.20 | 5.65 | 24.56 | 14.43 | 0.12 |
| 5 | C$_2$H$_5$ | H | —CH(CH$_3$)$_2$ | C$_{10}$H$_{19}$N$_3$O$_2$S.HCl | 144.5–145.5 | 42.62 | 7.15 | 12.58 | 14.91 | 42.50 | 6.93 | 12.66 | 14.81 | 0.04 |
| 6 | C$_2$H$_5$ | H | —C(CH$_3$)$_3$ | C$_{11}$H$_{21}$N$_3$O$_2$S.HCl | 137–8 | 34.63 | 7.49 | 11.98 | 14.20 | 44.67 | 7.81 | 12.23 | 13.96 | 0.05 |
| 7 | C$_2$H$_5$ | H | —C(CH$_3$)$_2$CH$_2$OH | C$_{11}$H$_{21}$N$_3$O$_3$S.HCl | 125–7 | 42.37 | 7.11 | 11.37 | 13.47 | 42.88 | 6.95 | 11.71 | 13.26 | 0.3 |
| 8 | C$_2$H$_5$O | H | —CH(CH$_3$)$_2$ | C$_{10}$H$_{19}$N$_3$O$_3$S.HCl | 167–70 | 40.33 | 6.77 | | 14.11 | 40.44 | 6.82 | | 13.87 | 0.035 |
| 9 | C$_2$H$_5$O | H | —C(CH$_3$)$_3$ | C$_{11}$H$_{21}$N$_3$O$_3$S.HCl | 147–9 | 42.37 | 7.11 | | 13.47 | 42.80 | 7.08 | | 13.02 | 0.057 |
| 10 | C$_2$H$_5$O | H | —CH$_2$C(CH$_3$)$_3$ | C$_{12}$H$_{23}$N$_3$O$_3$S.HCl | 168–9 | 44.23 | 7.42 | 10.88 | 12.89 | 43.99 | 7.45 | 11.36 | 13.08 | 5.3 |
| 11 | C$_2$H$_5$O | H | —C(CH$_3$)$_2$C≡CH | C$_{12}$H$_{19}$N$_3$O$_3$S.HCl | 130–1 | 44.79 | 6.26 | 11.02 | 13.06 | 44.79 | 6.65 | 11.33 | 12.98 | 0.08 |
| 12 | C$_2$H$_5$O | —(CH$_2$)$_2$—O—(CH$_2$)$_2$— | | C$_{11}$H$_{19}$N$_3$O$_4$S.HCl | 124–6 | 40.55 | 6.19 | 10.88 | 12.90 | 41.13 | 6.17 | 11.24 | 12.28 | 1.95 |
| 13 | C$_6$H$_5$ | H | —CH(CH$_3$)$_2$ | C$_{14}$H$_{19}$N$_3$O$_2$S.HCl | 165–7 | 50.98 | 6.12 | 10.75 | 12.74 | 51.09 | 6.33 | 11.05 | 12.92 | 0.08 |
| 14 | C$_6$H$_5$ | H | —C(CH$_3$)$_3$ | C$_{15}$H$_{21}$N$_3$O$_2$S.HCl | 168–170.5 | 52.39 | 6.45 | 10.39 | 12.22 | 52.12 | 6.40 | 10.57 | 12.35 | 0.02 |
| 15 | C$_6$H$_5$CH$_2$ | H | —C(CH$_3$)$_3$ | C$_{16}$H$_{23}$N$_3$O$_2$S.HCl | 122–3 | 53.42 | 6.76 | 9.90 | 11.74 | 53.59 | 6.79 | 10.36 | 11.66 | 0.12 |

EXAMPLE 16
3-morpholino-4-(3-tert-butylamino-2-hydroxypropoxy)-1,2,5-thiadiazole A mixture of 11.8 g. (39 millimoles) of 3-chloro-4-(3 - tert-butylamino-2-hydroxypropoxy)-1,2,5-thiadiazole hydrochloride from Example 1, Step B, and 65.5 ml. (752 millimoles) of morpholine is heated and stirred at 125–135° C. for four hours. This mixture is refrigerated overnight and the precipitated morpholine hydrochloride is collected and dried; yielding 8.55 g. (88.5%) M.P. 175–180° C. The excess morpholine is removed by distillation in vacuo to give 16.8 g. of residual oil. The residue is shaken with 10 ml. of water containing 1.6 g. of sodium hydroxide and extracted with diethyl ether. The combined ethereal extracts are washed sparingly with water and evaporated to dryness to give 11.7 g. of residue. The product is dissolved in anhydrous diethyl ether and treated with excess hydrogen chloride in diethyl ether to give 10.3 g. of crystalline product, M.P. 151–161° C. Recrystallization of this material from anhydrous acetonediethyl ether gives 3 - morpholine-4-(3-tert-butylamino - 2 - hydroxyproppoxy) - 1,2,5-thiadiazole hydrochloride, M.P. 161–163° C. ($ED_{50}$=0.013 mg./kg.).

Analysis.—Calculated for $C_{13}H_{25}ClN_4O_3S$ (percent): C, 44.25; H, 7.14; Cl, 10.50; N, 15.88; S, 9.08. Found (percent): C, 43.95; H, 7.50; Cl, 10.52; N, 15.82; S, 9.34.

In another preparation by the above procedure, the free base, 3-morpholino-4-(3-tert-butylamino-2-hydroxypropoxy)-1,2,5-thiadiazole, is isolated in 50.6% yield, M.P. 72–75° C. Recrystallization from diisopropyl ether gives the product melting at 71.5–72.5° C.

Analysis.—Calculated for $C_{13}H_{24}N_4O_3S$ (percent): C, 49.34; H, 7.64; N, 17.71; S, 10.13. Found (percent): C, 49.36; H, 7.51; N, 17.50; S, 10.11.

Treatment of the mother liquors from the recrystallized free base with hydrogen chloride affords an additional 25% yield of 3-morpholino-4-(3-tert-butylamino-2-hydroxypropoxy)-1,2,5-thiadiazole hydrochloride.

RESOLUTION OF EXAMPLE 16 PRODUCT

Section 11.—Preparation of optically active (−)-3-morpholino - 4-(3-tert-butylamino-2-hydroxypropoxy)-1,2,5-thiadiazole hydrogen maleate Racemic 3 - morpholino - 4 - (3 - tert-butylamino-2-hydroxypropoxy) - 1,2,5 - thiadiazole from Example 16, (11.7 g., 0.038 mole), and 2.8 g. (0.0187 mole of (+)-tartaric acid ($[\alpha]_D^{28°}$+12.9°, c.=20 in $H_2O$) are dissolved in 200 ml. of hot acetone containing 20 ml. of water and aged with stirring at room temperature over a weekend. Filtration of the crystalline precipitate gives 9.6 g. of di - [3 - morpholino - 4 - (3 - tert-butylamino-2-hydroxypropoxy) - 1,2,5 - thiadiazole]-(+)-tartrate, M.P. 181–183° C. ($[\alpha]_D^{28°}$+12.9° c.=1.82 in $CH_3OH$). Recrystallization of 9.2 g. of this tartrate from 125 ml. of hot acetone containing 12.5 ml. of water gives 6.4 g. of solid material, M.P. 179.5–181° C. ($[\alpha]_D^{28°}$+13.5°, c.=2.32 in $CH_3OH$). A 6.3 g. sample of this solid is shaken in a separatory funnel with 45 ml. N ammonium hydroxide and 100 ml. of ether for 10 minutes. The aqueous layer is extracted with 2× 100 ml. portions of ether. The combined ethereal extracts are washed with 2× 20 ml. aliquots of water, dried over magnesium sulfate, filtered, and concentrated in vacuo to give 5 g. of non-crystalline 3 - morpholino - 4 - (3-tert-butylamino-2 - hydroxypropoxy) - 1,2,5 - thiadiazole, ($[\alpha]_D^{28°}$ −1.82°, c.=2.45 in $CH_3OH$). A mixture of this base and 1.84 g. of maleic acid is dissolved in 240 ml. of hot ethyl alcohol and allowed to age at room temperature with stirring for 18 hours. Filtration of the crystalline solid yields 4.96 g. of 3 - morpholino - 4 - (3-tert-butylamino - 2 - hydroxypropoxy) - 1,2,5 - thiadiazole hydrogen maleate, M.P. 211–214° C. ($[\alpha]_D^{28°}$+0.45°, c.=2.8 in $CH_3OH$). The mother liquors are refluxed with 100 mg. of "Darco" decolorizing charcoal for 5 minutes, filtered hot, and concentrated to 30 ml. This solution is aged at room temperature with stirring for 18 hours to give 1.029 g. of crystalline (−) - 3 - morpholino-4-(3-tert-butylamino - 2 - hydroxypropoxy) - 1,2,5 - thiadiazole hydrogen maleate, M.P. 205–207° C., ($[\alpha]_D^{28°}$+4.17°, c.=2.99 in $CH_3OH$). The mother liquors are diluted with 100 ml. of ether, from which is collected by filtration an additional 350 mg. of product, M.P. 203–204° C. A 321 mg. sample is recrystallized from 3 ml. of ethyl alcohol to give 270 mg. of (−) - 3 - morpholino-4-(3 - tert-butylamino - 2 - hydroxypropoxy) - 1,2,5-thiadiazole hydrogen maleate, M.P. 202–203° C. ($[\alpha]_D^{28°}$+5.0° c.=3.02 in $CH_3OH$). The infrared spectrum of this sample is identical to that of the racemic hydrogen maleate.

Analysis.—Calculated for $C_{17}H_{28}N_4O_7S$ (percent): C, 47.21; H, 6.53; N, 12.95; S, 7.41. Found (percent): C, 47.57; H, 6.56; N, 12.86; S, 7.48.

Section 12.—Preparation of optically active (−) - 3-morpholino - 4 - (3 - tert-butylamino - 2 - hydroxypropoxy) - 1,2,5 - thiadiazole from its dextrorotatory hydrogen maletate salt (−) - 3 - morpholino - 4 - (3 - tert-butylamino-2-hydroxypropoxy) - 1,2,5 - thiadiazole hydrogen maleate, ($[\alpha]_D^{28°}$+5.0°, c.=3.02 in $CH_3OH$), (100 mg. from Section 11), 100 ml. of ether and 20 ml. of N ammonium hydroxide is shaken in a separatory funnel for 5 minutes. The aqueous layer is extracted with an additional 50 ml. of ether, and the combined ethereal extracts are washed with 2× 20 ml. of water, dried over magnesium sulfate, filtered, and concentrated in vacuo to give 70 mg. of oily (−) - 3 - morpholino - 4 - (3-tert-butylamino - 2 - hydroxypropoxy) - 1,2,5 - thiadiazole, ($[\alpha]_D^{28°}$−4.32°, c.=5.13 in $CH_3OH$).

Section 13.—Resolution with (−)-tartaric acid

By following the resolution procedure described in Section 11 above, but substituting an equal quantity of (−)-tartaric acid for the (+)-tartaric employed in Section 11, the resolution of 3-morpholino-4-(3-tert-butylamino - 2 - hydroxypropoxy) - 1,2,5 - thiadiazole affords the (+)-3-morpholino - 4 - (3 - tert-butylamino-2-hydroxypropoxy) - 1,2,5 - thiadiazole hydrogen maleate, ($[\alpha]_D^{28°}$−4.4°, c.=2.56 in $CH_3OH$). Further fractional recrystallization gives rise to $[\alpha]_D^{28°}$−5.0° for the hydrogen maleate salt.

Section 14.—Preparation of (+) - 3 - morpholino-4-(tert - butylamino - 2 - hydroxypropoxy) - 1,2,5-thiadiazole from its levorotatory hydrogen maleate salt By replacing the (−) - 3 - morpholino - 4 - (3-tert-butylamino - 2 - hydroxypropoxy) - 1,2,5 - thiadiazole hydrogen maleate employed in Section 12, with the (+)-3 - morpholino - 4 - (3 - tert-butylamino - 2 - hydroxypropoxy) - 1,2,5 - thiadiazole hydrogen maleate prepared as described in Section 13 above, and and following the same procedure described in Section 13 above, and following the same procedure deescribed in Section 12, there is obtained the (+) - 3 - morpholino - 4 - (3-tert-butylamino - 2 - hydroxypropoxy) - 1,2,5 - thiadiazole, ($[\alpha]_D^{28°}$+4.32°, c.=5.13 in $CH_3OH$).

ALTERNATIVE PREPARATION OF OPTICALLY ACTIVE ISOMERS OF EXAMPLE 16 PRODUCT

CONVERSION OF (+) - 3 - CHLORO - 4 - (3-TERT-BUTYLAMINO-2-HYDROXYPROPOXY)-1,2,5-THIADIAZOLE TO (+) - 3 - MORPHOLINO-4-(3-TERT-BUTYLAMINO-2-HYDROXYPROPOXY)-1,2,5-THIADIAZOLE

Section 15.—Preparation of (+) - 3 - morpholino - 4-3 - tert - butylamino - 2 - hydroxypropoxy) - 1,2,5-thiadiazole A mixture of 5.3 g. (20 millimoles of M.P. 58.5–62.5° C.) of (+) - 3 - chloro - 4 - (3-tert-butylamino-2 - hydroxypropoxy) - 1,2,5 - thiadiazole and 26.5 ml. of freshly distilled morpholine are heated for four hours at 135–40° C. The cooled mixture is refrigerated overnight and the precipitated solids collected, washed with anhydrous diethyl ether, and dried to give 2.18 g. (88.3%) of morpholine hydrochloride. The filtrate and washings are combined and evaporated to give an oily product. This material is dissolved in 150 ml. of diethyl ether, washed several times with water, and evaporated to dryness to give 5.7 g. of (+) - 3 - morpholino - 4 - (3-tert-butylamino - 2 - hydroxypropoxy) - 1,2,5 - thiadiazole as a slightly yellow oil.

Section 16.—Preparation of (+)-3-morpholino-4-(3-tert-butylamino-2-hydroxypropoxy)-1,2,5 - thiadiazole hydrogen maleate A warm solution of 5.7 g. (18 millimoles) of (+)-3-morpholino - 4 - (3-tert-butylamino-2-hydroxypropoxy)-1,2,5-thiadiazole in 10 ml. of isopropanol is treated with a warm solution of 2.09 g. (18 millimoles) of maleic acid in 10 ml. of isopropanol. The solution is allowed to cool, left 2 hours at 5° C., and the solids collected to give 6.7 g. (86%) of (+)-3-morpholino-4-(3-tert-butylamino-2-hydroxypropoxy)-1,2,5-thiadiazole hydrogen maleate, M.P. 19—4° C. (dec.) ($[\alpha]_D^{20}$ —4.3°, c=3.3 in $CH_3OH$). Crystallization of this product from anhydrous ethanol affords 3.85 g. of (+)-3-morpholino-4-(3-tert-butylamino-2-hydroxypropoxy)-1,2,5 - thiadiazole hydrogen maleate, M.P. 201–2° C. ($[\alpha]_D^{20°}$—5.57°, c.=3.35 in $CH_3OH$), ($ED_{50}$=0.0066 mg./kg.).

CONVERSION OF (−)-3-CHLORO - 4 - (3 - TERT-BUTYLAMINO-2-HYDROXY-2,5-THIADIAZOLE TO (−)-3-MORPHOLINO-4-(3-TERT-BUTYLAMINO - 2 - HYDROXYPROPOXY)-1,2,5-THIADIAZOLE

Section 17.—Preparation of (−)-3-morpholino-4-(3-tert-butylamino-2-hydroxypropoxy)-1,2,5-thiadiazole Following the procedure described in Section 15, a mixture of 6.9 g. (26 millimoles of material of M.P. 57–60°) of (−) - 3 - chloro-4-(3-tert-butylamino-2-hydroxy-propoxy)-1,2,5-thiadiazole and 34.5 ml. of freshly distilled morpholine are heated at 135–40° C. for four hours and the product isolated giving 7.2 g. of (−)-3-morpholino-4 - (3 - tert-butylamino-2-hydroxypropoxy)-1,2,5-thiadiazole as a slightly yellow oil.

Section 18.—Preparation of (−)-3-morpholino-4-(3-tert-butylamino-2-hydroxypropoxy) - 1,2,5 - thiadiazole hydrogen maleate The oily (−)-3-morpholino-4-(3-tert-butylamino-2-hydroxypropoxy)-1,2,5-thiadiazole (7.2 g.) in 13 ml. of isopropanol is treated with a solution of 2.65 g. (22.8 millimoles) of maleic acid in 13 ml. of isopropanol to afford 9.04 g. (80%) of crude (−)-3-morpholino-4-(3-tert-butylamino-2-hydroxypropoxy) - 1,2,5-thiadiazole hydrogen maleate, M.P. 190–3.5° C. Careful fractional crystallization of this material from ethanol affords 5.0 g. (−)-3-morpholino - 4-(3-tert-butylamino-2-hydroxypropoxy)-1,2,5-thiadiazole hydrogen maleate, M.P. 201.5–2.5° C. (dec.), ($[\alpha]_D^{22°}$+5.30°, c.=3.3 in $CH_3OH$). A further recrystallization from the same solvent affords material, M.P. 201–2° C. (dec.), ($[\alpha]_D^{22°}$+5.56°, c.=3.2 in $CH_3OH$)

($ED_{50}$=0.088 mg./kg.).

Additional products of this invention that advantageously are prepared by the procedure described in Example 16 are identified in Table II, below. These products are synthesized by following the procedure identified in Example 16 but replacing the 3-chloro-4-(3-tert-butylamino-2-hydroxypropoxy)-1,2,5-thiadiazole hydrochloride by the reactant I-d having the $R^6$ substituent identified in the table and replacing the morpholine employed in Example 16 by the amine reactant "F" having the substituents identified for this reactant in the following table under the headings $R^7$ and $R^8$. The $R^6$, $R^7$ and $R^8$ groups identified for the starting materials "F" and I-d are retained in the end product I-a for which physical properties are provided.

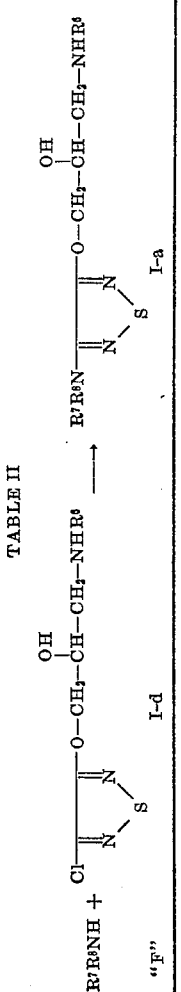

TABLE II

| Ex. No. | $R^7$ | $R^8$ | $R^6$ | Empirical formula | Melting point in °C. | Analysis Calculated | | | | | | Analysis Found | | | | | | $ED_{50}$, mg./kg. |
|---|---|---|---|---|---|---|---|---|---|---|---|---|---|---|---|---|---|---|
| | | | | | | C | H | Cl | N | S | | C | H | Cl | N | S | | |
| 17 | —$(CH_2)_2$—O—$(CH_2)_2$— | | $(CH_3)_2CH$— | $C_{12}H_{22}N_4O_3S \cdot HCl$ | 168.5–170.5 | 42.54 | 6.84 | 10.46 | 16.53 | 9.46 | | 42.36 | 7.48 | 10.64 | 16.70 | 9.60 | | 0.13 |
| 18 | —$(CH_2)_2$—N—$(CH_2)_2$— CH_3 | | $(CH_3)_3C$— | $C_{14}H_{27}N_5O_2S \cdot 2HCl \cdot H_2O$ | 205 | 40.00 | 7.43 | 16.87 | 16.75 | 7.63 | | 39.92 | 7.38 | 16.80 | 16.65 | 7.62 | | |
| 19 | —$(CH_2)_5$— | | $(CH_3)_2CH$— | $C_{14}H_{26}N_4O_2S \cdot HCl$ | 169–170.5 | 46.35 | 7.48 | 10.52 | 16.63 | 9.52 | | 46.71 | 7.32 | 10.58 | 16.40 | 9.42 | | 0.03 |
| 20 | —$(CH_2)_5$— | | $(CH_3)_3C$— | $C_{14}H_{26}N_3O_2S \cdot HCl$ | 171–2 | 47.92 | 7.76 | 10.10 | 15.97 | 9.14 | | 48.06 | 8.29 | 10.29 | 16.04 | 9.40 | | 0.03 |
| 21 | —$(CH_2)_2$—CH—$(CH_2)_2$— OH | | $(CH_3)_3C$— | $C_{14}H_{26}N_4O_3S \cdot C_4H_4O_4$ | 171–3 | 48.42 | 6.77 | | 12.55 | 7.18 | | 48.33 | 6.83 | | 12.34 | 7.21 | | 0.033 |

The preparation by Route 3 of products having a carbamyl substituent in the 3-position of the thiadiazole is illustrated by the following two examples:

EXAMPLE 22

3-N-tert-butylcarbamoyl-4-(3-tert-butylamino-2-hydroxypropoxy)-1,2,5-thiadiazole

STEP A: 4-ALLYLOXY-1,2,5-THIADIAZOLE-3-CARBOXYLIC ACID

A mixture of 1 mole of 4-allyloxy-3-cyano-1,2,5-thiadiazole in 10 parts (volume/grams) of 80% ethanol containing 4 equivalents of sodium hydroxide per equivalent of the thiadiazole is refluxed for 2 hours. The ethanol is removed in vacuo and the remaining residue dissolved in a minimum amount of water and made acidic (pH 2) with hydrochloric acid. The precipitated 4-allyloxy-1,2,5-thiadiazole-3-carboxylic acid is removed by filtration and washed with water to give a 90% yield of product, M.P. 138–139° C.

STEP B: 4-(3-BROMO-2-HYDROXYPROPOXY)-1,2,5-THIADIAZOLE-3-CARBOXYLIC ACID

A mixture of 9.3 g. (50 millimoles) of 4-allyloxy-1,2,5-thiadiazole-3-carboxylic acid and 8.9 g. (50 millimoles) of N-bromo-succinimide is suspended in 50 ml. of water. The mixture initially turns brown and evolves heat but after one minute a colorless solution results. The white crystals that deposit upon cooling are collected, washed with water, and dried giving 8.0 g. (56.5%) of 4-(3-bromo-2-hydroxypropoxy)-1,2,5-thiadiazole-3-carboxylic acid. Recrystallization of the product from ethyl acetate affords the purified bromohydrin, M.P. 175.0–177.5° C.

Analysis.—Calculated for $C_6H_7BrN_2O_4S$ (percent): C, 25.45; H, 2.49; Br, 28.23; N, 9.89; S, 11.32. Found (percent): C, 25.29; H, 2.38; Br, 28.14; N, 9.79; S, 11.28.

STEP C: 3-CARBOMETHOXY-4-(3-BROMO-2-HYDROXYPROPOXY)-1,2,5-THIADIAZOLE

To a solution of 5 ml. (excess) of acetyl chloride in 40 ml. of anhydrous methanol is added 5.66 g. (20 millimoles) of 4-(3-bromo-2-hydroxypropoxy)-1,2,5-thiadiazole-3-carboxylic acid and the suspension is stirred for eighteen hours at room temperature. The resulting solution is evaporated to dryness to afford a colorless oil whose infrared spectrum is consistent with the proposed structure of 3-carbomethoxy-4-(3-bromo-2-hydroxypropoxy)-1,2,5-thiadiazole which is used without further purification in the following step.

STEP D: 3-N-TERT-BUTYLCARBAMOYL-4-(3-TERT-BUTYLAMINO-2-HYDROXYPROPOXY)-1,2,5-THIADIAZOLE

A mixture of 1.49 g. (5 millimoles) of 3-carbomethoxy-4-(3-bromo-2-hydroxypropoxy)1,2,5-thiadiazole in 6 ml. (excess) of tert-butylamine is refluxed for ninety hours. Considerable tertiary butylamine hydrobromide is precipitated by the addition of 100 ml. of diethyl ether. The salt is collected and the filtrate concentrated to remove diethyl ether and excess tert-butylamine. The resulting oil is dissolved in chloroform and washed sparingly with water. The chloroform layer is evaporated to give an oil that is dissolved in a mixture of methanol-diethyl ether and treated with a stream of hydrogen chloride until precipitation is complete. The solvent and excess hydrogen chloride are removed in vacuo. The residual oil is dissolved in hot ethyl acetate and cooled to give 1.2 g. of crystals. Further recrystallization of the product from ethyl acetate-diethyl ether and then methanol-diethyl ether affords pure 3-N-tert-butylcarbamoyl-4-(3-tert-butylamino-2-hydroxypropoxy)-1,2,5-thiadiazole hydrochloride, M.P. 145–147° C.

Analysis.—Calculated for $C_{14}H_{27}ClN_4O_3S$ (percent): Cl, 9.66; N, 15.27; S, 8.74. Found (percent): Cl, 9.69; N, 15.61; S, 8.75.

EXAMPLE 23

3-N-isopropylcarbamoyl-4-(3-isopropylamino-2-hydroxypropoxy)-1,2,5-thiadiazole

A mixture of 1.49 g. (5 millimoles) of 3-carbomethoxy - 4 - (3-bromo-2-hydroxypropoxy)-1,2,5-thiadiazole (prepared as described in Example 22, Step B) and 10 ml. of isopropylamine is refluxed and stirred for seven days. The excess isopropylamine is removed in vacuo, and the residue is dissolved in diethyl ether. The ethereal solution is washed with water, dried, and evaporated to give 0.4 g. of oil. The oil is dissolved in methanol-diethyl ether and treated with excess hydrogen chloride. Evaporation of the solvent and treatment of the residue with ethyl acetate-methanol-diethyl ether gives 0.4 g. of crystalline product. Recrystallization of the product from ethyl acetate-methanol-diethyl ether gives 3-N-isopropylcarbamoyl - 4 - (3 - isopropylamino-2-hydroxypropoxy)-1,2,5-thiadiazole hydrochloride, M.P. 96–99° C.

Analysis.—Calculated for $C_{12}H_{23}ClN_4O_3S$ (percent): Cl, 10.46; N, 16.53; S, 9.46. Found (percent): Cl, 10.46; N, 16.11; S, 9.25.

The following examples illustrate methods for the preparation of products of this invention illustrated by structure I above, wherein $R^1$, $R^2$, $R^3$ and/or $R^4$ are other than hydrogen:

EXAMPLE 24

3-morpholino-4-(3-butylamino-2-hydroxybutoxy)-1,2,5-thiadiazole

STEP A: PREPARATION OF 3-CHLORO-4-(3-CHLORO-2-HYDROXYBUTOXY)-1,2,5-THIADIAZOLE 3-chloro-4-hydroxy-1,2,5-thiadiazole is treated with 2-chloroacetic acid in the presence of ethanolic sodium hydroxide to give 3-chloro-4-carboxymethoxy-1,2,5-thiadiazole. Treatment of this acid with thionyl chloride or oxalyl chloride affords the acid chloride. The acid chloride (1 part) in 20 parts of diethyl ether is treated dropwise at —10° to —15° C. with a slight excess of diazoethane in 30 parts of diethyl ether and the mixture stirred one hour longer at —10° C. The solution is left at room temperature overnight, cooled to —10° to —15° C. and treated with anhydrous hydrogen chloride until evolution of nitrogen is complete. The solution is successively washed with water, a 5% sodium carbonate solution, and water. The dried solution is evaporated to a residue to give 3 - chloro-4-(3-chloro-2-oxobutoxy)-1,2,5-thiadiazole. The crude 3-chloro-4-(3-chloro-2-oxobutoxy)-1,2,5-thiadiazole (1 part) in 5 parts of isopropanol is treated at 0–5° C. with a solution containing an excess of sodium borohydride in 5 parts of isopropanol. The mixture is left for 3 to 5 hours at room temperature, then poured onto a mixture of ice and acetic acid, the mixture is extracted with ether, and worked up to give 3-chloro-4-(3-chloro-2-hydroxybutoxy)-1,2,5-thiadiazole.

STEP B: PREPARATION OF 3 - CHLORO - 4- (3 - BUTYLAMINO-2-HYDROXYBUTOXY)-1,2,5 - THIADIAZOLE HYDROCHLORIDE

A mixture of 1 part of 3-chloro-4-(3-chloro-2-hydroxybutoxy)-1,2,5-thiadiazole and 7.5 parts of butylamine is heated for 10 hours at 100° C. in a sealed vessel. The product is isolated by the method described in Example 1, Step B, to give 3-chloro-4-(3-butylamino-2-hydroxybutoxy)-1,2,5-thiadiazole. The base is dissolved in anhydrous diethyl ether and treated with anhydrous hydrogen chloride to give 3-chloro-4-(3-butylamino-2-hydroxybutoxy)1,2,5-thiadiazole hydrochloride.

STEP C: PREPARATION OF 3-MORPHOLINO - 4 - (3-BUTYLAMINO-2-HYDROXYBUTOXY)-1,2,5-THIADIAZOLE

A mixture of 1 part of 3-chloro-4-(3-butylamino-2-hydroxybutoxy)-1,2,5-thiadiazole hydrochloride in 5 parts of freshly distilled morpholine is heated for four hours at 135–40° C. The product is isolated by the method described in Example 16 to give 3-morpholino-4-(3-butyl-amino-2-hydroxybutoxy)-1,2,5-thiadiazole which is converted to its hydrochloride salt.

EXAMPLE 25

3-morpholino-4-(3-butylamino-2-hydroxy-1-methylpropoxy)-1,2,5-thiadiazole

STEP A: PREPARATION OF 3-CHLORO-4-(3-CHLORO-2-HYDROXY-1-METHYLPROPOXY)-1,2,5-THIADIAZOLE 3-chloro-4-(3-chloro-2-hydroxy - 1 - methylpropoxy)-1,2,5-thiadiazole is prepared by a sequence of reactions similar to those described in Example 24, Step A. Thus 3-chloro-4-hydroxy-1,2,5-thiadiazole is condensed with 2-bromopropionic acid to give 3-chloro-4-(1-methylcarboxymethoxy)-1,2,5-thiadiazole. The acid is converted by conventional methods to the acid chloride and the acid chloride treated with diazomethane in diethyl ether at −10° to −15° C. The dried ethereal solution is treated with anhydrous hydrogen chloride and the resulting chloroketone reduced with sodium borohydride to give 3-chloro-4-(3-chloro-2-hydroxy-1-methylpropoxy) - 1,2,5-thiadiazole.

STEP B: PREPARATION OF 3-MORPHOLINO - 4 - (3-BUTYLAMINO - 2 - HYDROXY-1-METHYLPROPOXY)-1-2,5-THIADIAZOLE

The procedure set forth in Example 24, Step B, is repeated with the exception that 3-chloro-4-(3-chloro-2-hydroxybutoxy)-1,2,5-thiadiazole is replaced by 3-chloro-4-(3-chloro-2-hydroxy-1-methylpropoxy) - 1,2,5 - thiadiazole. Thus 3-chloro-4-(3-butylamino-2-hydroxy-1-methyl propoxy)-1,2,5-thiadiazole is obtained and isolated as the hydrochloride salt. Treatment of either 3-chloro-4-(3-butylamino - 2 - hydroxy-1-methylpropoxy)-1,2,5-thiadiazole or its hydrochloride salt with morpholine as described in Example 16 gives 3-morpholino-4-(3-butyl-amino-2-hydroxy-1-methylpropoxy)-1,2,5-thiadiazole that is isolated as its hydrochloride salt.

EXAMPLE 26

3-morpholino-4-(3-butylamino-2-acetoxypropoxy)-1,2,5-thiadiazole hydrochloride

A mixture of 1 part of 3-morpholino-4-(3-butylamino-2-hydroxypropoxy)-1,2,5-thiadiazole, 5 parts of acetic acid, and 1 part of acetic anhydride is left 24 hours at room temperature. The solution is poured on ice, made alkaline with ammonium hydroxide, extracted with ethyl ether, and the ethereal solution dried over anhydrous magnesium sulfate. The ethereal solution is treated with anhydrous hydrogen chloride and the precipitated product is recrystallized from ethanol-diethyl ether to give 3-morpholino-4-(3-butylamino-2-acetoxypropoxy) - 1,2,5-thiadiazole hydrochloride.

EXAMPLE 27

3-morpholino-4-(3-butylamino-2-benzoyloxypropoxy)-1,2,5-thiadiazole hydrochloride A mixture of 1 part of 3-morpholino-4-(3-butylamino-2-hydroxypropoxy)-1,2,5-thiadiazole hydrochloride and 2.5 parts of benzoyl chloride is heated for 4–6 hours at 100° C. The mixture is cooled and added to 25 parts of diethyl ether. The ether is decanted, the remaining solid is slurried with a further 25 parts of diethyl ether, and the mixture is filtered. The collected product is washed several times with further amounts of diethyl ether. The solid is recrystallized from ethanol-diethyl ether to give 3-morpholino - 4 - (3-butylamino-2-benzoyloxypropoxy)-1,2,5-thiadiazole hydrochloride.

The compounds represented by those prepared in Examples 26 and 27, i.e., those in which the 2-hydroxy group of the side chain are esterified are readily converted back to the starting 2-hydroxy compounds by de-esterification either with dilute alkali or acid, using standard experimental conditions.

EXAMPLE 28

3-morpholino-4-(3-butylamino-2-hydroxypropoxy)-1,2,5-thiadiazole benzoate

A solution of 1 part of 3-morpholino-4-(3-butylamino-2-hydroxypropoxy)-1,2,5-thiadiazole in 50 parts of ethyl acetate is added to a solution of 1 part of benzoic acid in 40 parts of diethyl ether. The resulting solid is collected on a filter plate and washed several times with diethyl ether. The product is crystallized from ethanol-diethyl ether to give 3-morpholino-4-(3-butylamino-2-hydroxypropoxy)-1,2,5-thiadiazole benzoate.

PREPARATION OF 3-R-4-HYDROXY-1,2,5-THIADIAZOLES

The novel 3-R-4-hydroxy-1,2,5-thiadiazole starting materials in Route I synthesis are made by esterification of the α-aminoacid, R—CH(NH$_2$)CO$_2$H, by reaction with a suitable lower alkanol to produce the ester, $$R—CH(NH_2)CO_2-Alkyl$$

which when treated with ammonia is converted to the amide, R—CH(NH$_2$)CONH$_2$. Reaction of the amide with sulfur monochloride provides the desired 3-R-4-hydroxy-1,2,5-thiadiazole.

The following table identifies additional 3-R-4-hydroxy-1,2,5-thiadiazoles that are representative of the starting materials that are and can be prepared by the procedure described above, employing the α-aminoacid, $$R—CH(NH_2)CO_2H$$

having the R-group identified in the following table, which are esterified with methanol (although other lower alkanols can be employed, as ethanol, propanol, isopropanol and the like) to provide the methyl or other lower alkyl ester, which then is converted by treatment with ammonia to give the amide. Reaction of the amide with sulfur monochloride provides the 3-R-4-hydroxy-1,2,5-thiadiazole (product A) having the group R attached to the carbon present at position 3 identified in the table.

By substituting the thiadiazole products thus obtained in Route I, for example, by replacing the 3-chloro-4-hydroxy-1,2,5-thiadiazole of Example 1 by an equivalent quantity of the 3-R-4-hydroxy-1,2,5-thiadiazole identified in the following table and using an excess of an amine of the structure HNR$^5$R$^6$ (also identified in the table) for the tert-butylamine used in Step B of Example 1, but otherwise following substantially the same procedure there described, the thiadiazole products I–b are obtained having the R, R$^5$ and R$^6$ substituents identified in Table III.

TABLE III

R–CH$_2$(NH$_2$)CO$_2$H + CH$_3$OH ⟶ R–CH(NH$_2$)CO$_2$CH$_3$ + NH$_3$

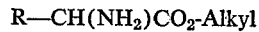

⟵ S$_2$Cl$_2$ + R–CH(NH$_2$)–CONH$_2$ ⟵

"A"

Route I using HNR$^5$R$^6$
"A" + ⟶

—O—CH$_2$CH(OH)—CH$_2$—NR$^5$R$^6$

I–b

| R | R$^5$ | R$^6$ |
|---|---|---|
| CH$_3$—S—CH$_2$— | H | (CH$_3$)$_3$C— |
| C$_2$H$_5$—S—CH$_2$— | H | (CH$_3$)$_2$CH— |
| C$_3$H$_7$—S—CH$_2$— | H | (CH$_3$)$_2$CH— |
| (CH$_3$)$_2$CH—S—CH$_2$— | H | (CH$_3$)$_3$C— |
| C$_4$H$_9$—S—CH$_2$— | H | (CH$_3$)$_2$CH— |
| C$_5$H$_5$—S—CH$_2$— | H | (CH$_3$)$_3$C— |
| C$_6$H$_5$CH$_2$—S—CH$_2$— | H | (CH$_3$)$_3$C—CH$_2$— |
| 2-(CH$_3$—S)C$_2$H$_4$— | H | (CH$_3$)$_3$C— |

TABLE—Continued

| R | R⁵ | R⁶ |
|---|---|---|
| 2-($C_2H_5$—S)$C_2H_4$— | H | CH≡C—C($CH_3$)$_2$— |
| 2-($C_3H_7$—S)$C_2H_4$— | H | HO—$CH_2$—C($CH_3$)$_2$— |
| 2-[($CH_3$)$_2$CH—S]$C_2H_4$— | H | HO—$CH_2$—C($CH_3$)$_2$— |
| 2-($C_4H_9$—S)$C_2H_4$— | | ($CH_2$)$_2$—O—($CH_2$)$_2$ |
| 2-[($CH_3$)$_2$CHCH$_2$—S]$C_2H_4$— | | ($CH_2$)$_2$—O—($CH_2$)$_2$ |
| $CH_3$—O—$CH_2$— | H | ($CH_3$)$_2$CH— |
| $C_2H_5$—O—$CH_2$— | H | ($CH_3$)$_3$C— |
| ($CH_3$)$_3$C—O—$CH_2$— | H | ($CH_3$)$_3$C— |
| $C_6H_5CH_2$—O—$CH_2$— | H | ($CH_3$)$_2$CH— |
| 2-($CH_3$—O)$C_2H_4$— | H | ($CH_3$)$_3$C— |
| 2-($C_2H_5$—O)—$C_2H_4$— | H | ($CH_3$)$_3$C— |
| 2-($C_3H_7$—O)$C_2H_4$— | H | ($CH_3$)$_3$C— |
| 2-($C_4H_9$—O)$C_2H_4$— | H | ($CH_3$)$_2$CH— |
| 2-[($CH_3$)$_3$C—O]$C_2H_4$— | H | ($CH_3$)$_3$C— |
| 2-($C_6H_5$—O)$C_2H_4$— | H | HO—$CH_2$—C($CH_3$)$_2$— |
| 2-[(4-Cl—$C_6H_4$)—O]$C_2H_4$— | H | ($CH_3$)$_2$CH— |
| 2-[(2,4-Cl$_2$—$C_6H_3$)—O]$C_2H_4$— | H | ($CH_3$)$_2$CH— |
| 2-[(3-F—$C_6H_4$)—O]$C_2H_4$— | H | ($CH_3$)$_3$C— |
| 2-[(4-$CH_3$—$C_6H_4$)—O]$C_2H_4$— | H | ($CH_3$)$_2$CH— |
| 2-[(4-OH—$C_6H_4$)—O]$C_2H_4$— | H | ($CH_3$)$_2$CH— |
| 2-[3,4-(OH)$_2$—$C_6H_3$]—O]$C_2H_4$— | H | ($CH_3$)$_2$CH— |
| 2-[3,4-($CH_3$O)$_2$$C_6H_3$]—O]$C_2H_4$— | H | ($CH_3$)$_3$C |
| 2-[(3-HO-4-$CH_3$O—$C_6H_3$)—O]$C_2H_4$— | H | ($CH_3$)$_2$CH— |
| 2-[(4-$CH_3$O—$C_6H_4$)—O]$C_2H_4$— | H | ($CH_3$)$_3$C— |
| 2-($C_6H_5$)$C_2H_4$— | H | ($CH_3$)$_2$CH— |
| 2-(4-Cl—$C_6H_4$)$C_2H_4$— | H | ($CH_3$)$_3$C— |
| 2-(2-Br—$C_6H_4$)$C_2H_4$— | H | ($CH_3$)$_2$CH— |
| 2-(4-HO—$C_6H_4$)$C_2H_4$— | H | ($CH_3$)$_2$CH— |
| 2-(4-$CH_3$O—$C_6H_4$)$C_2H_4$— | H | ($CH_3$)$_2$CH— |
| 2-[3,4,5-($CH_3$O)$_3$—$C_6H_2$]$C_2H_4$— | H | ($CH_3$)$_3$C—$CH_2$— |
| 3-$C_6H_5$—$C_3H_6$— | H | ($CH_3$)$_3$C—$CH_2$— |
| $C_6H_5$—CH(— with $C_2H_5$) | H | ($CH_3$)$_2$CH— |
| [3,4-(HO)$_2$$C_6H_3$]—CH(— with $C_2H_5$) | H | ($CH_3$)$_3$C— |
| [3,4-($CH_3$O)$_2$$C_6H_3$]—CH(— with $C_2H_5$) | H | ($CH_3$)$_3$C— |
| 3-(4-Cl—$C_6H_4$)—$C_3H_6$— | H | ($CH_3$)$_3$C— |
| 3-(4-Br—$C_6H_4$)—$C_3H_6$— | H | ($CH_3$)$_2$CH— |
| 3-(4-$CH_3$—$C_6H_4$)—$C_3H_6$— | H | ($CH_3$)$_3$C— |
| 3-[2,4-(Cl)$_2$—$C_6H_3$]—$C_3H_6$— | H | ($CH_3$)$_3$C— |
| 4-Cl—$C_6H_4$— | H | ($CH_3$)$_3$C— |
| 4-$CH_3$—$C_6H_4$— | H | ($CH_3$)$_3$C— |
| 4-$CH_3$O—$C_6H_4$— | H | ($CH_3$)$_3$C— |
|  (furyl) | H | ($CH_3$)$_3$C— |
|  (thienyl) | H | ($CH_3$)$_3$C— |
|  (pyrrolyl) | | ($CH_2$)$_2$—N(H)—($CH_2$)$_2$ |
|  (pyridyl) | | ($CH_2$)$_2$—N(H)—($CH_2$)$_2$ |
|  (pyridyl) | | ($CH_2$)$_2$—N($CH_3$)—($CH_2$)$_2$ |
|  (pyridyl) | | ($CH_2$)$_2$—N(H)—($CH_2$)$_2$ |

Additional products of this invention that are prepared by the procedures described in Routes I and II and more particularly illustrated by Examples 1 and 16 are identified in the following table. The compounds identified in Table IV wherein R is a group having the structure $R^7R^8N$— are advantageously prepared from the compound

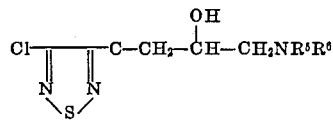

synthesized by the process substantially as described in Example I and then replacing the 3-chloro by the $R^7R^8N$— group by reaction with the selected amine by substantially the same procedure described in Example 16. The following products are prepared according to Examples 1 and 16 procedures except that the 3-R-4-hydroxy-1,2,5-thiadiazole starting substances, where necessary, can be prepared by the procedure described above for the products disclosed in Table III.

TABLE IV

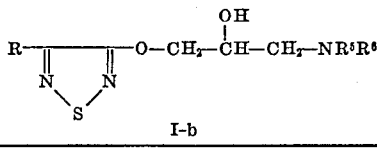

I-b

| R | R⁵ | R⁶ |
|---|---|---|
| Cl | H | —C($CH_3$)$_2$—$C_7H_{15}$ |
| Cl | H | —C($CH_3$)($CH_3$—CH—$CH_3$ branch)—$C_7H_{15}$ |
| $C_2H_5$— | H | —CH($CH_3$)—$C_2H_5$ |
| $C_2H_5$O— | H | —$CH_2$—CH($CH_3$)$_2$ |
| $C_2H_5$O— | H | —CH($CH_3$)—$C_3H_7$ |
| $C_2H_5$O— | H | —$C_6H_{13}$ |
| $C_6H_5$—$CH_2$— | H | —$C_8H_{17}$ |
| $C_2H_5$O— | H | —CH($CH_3$)—$C_6H_{13}$ |
| $C_2H_5$ | H | —CH($C_2H_5$)—$C_2H_5$ |
| $C_2H_5$O— | H | —CH($C_2H_5$)—$C_3H_7$ |
| 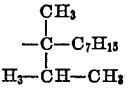 (morpholino) | H | —CH($CH_3$)—CH($CH_3$)—$CH_3$ |
|  (morpholino) | H | —CH($C_2H_5$)—$C_4H_9$ |
| Cl | H | —CH($CH_3$)—C($CH_3$)$_2$—$CH_3$ |
|  (piperidino) | H | —$C_{10}H_{21}$ |
|  (N-methylpiperazino) | H | —CH($CH_3$)—$C_7H_{15}$ |
|  (4-hydroxypiperidino) | H | —CH($CH_3$)—$C_5H_{11}$ |

TABLE—Continued

| R | R⁵ | R⁶ |
|---|---|---|
| C₆H₅— | H | —CH₂—CH=CH₂ |
| C₆H₅— | H | —CH₂—C(CH₃)=CH₂ |
| piperidino (H N—) | H | cyclopropyl (H) |
| piperidino (H N—) | H | cyclopentyl (H) |
| C₂H₅— | H | cyclohexyl (H) |
| C₂H₅O— | H | cyclopentyl (H) |
| morpholino (O  H  N—) | H | 2-methylcyclohexyl (CH₃, H) |
| Cl | H | —(CH₂)₃—O—C₂H₅ |
| C₂H₅— | H | —(CH₂)₃—O—CH₃ |
| C₂H₅— | H | —(CH₂)₂—O—C₃H₇ |
| Cl | H | —(CH₂)₂—O—(CH₂)₂—O—C₄H₉ |
| morpholino (O  H  N—) | H | —C(CH₃)₂—CH₂—O—C₆H₅ |
| C₂H₅— | H | —CH(CH₃)—CH₂—O—C₆H₅ |
| C₂H₅O— | H | —(CH₂)₂—O—C₆H₅ |
| piperidino (H N—) | H | —CH(CH₃)—CH₂—O—⟨C₆H₄⟩—OC₂H₅ |
| HO—piperidino (HO  H  N—) | H | —(CH₂)₂—O—⟨C₆H₄⟩—CH₃ |
| C₆H₅— | H | —CH(C₂H₅)—CH₂—OH |
| morpholino (O  H  N—) | H | —CH(CH₃)—CH(OH)—CH₃ |
| Cl | H | —CH(CH₃)—CH(OH)—C₆H₅ |
| C₆H₅— | H | —C(CH₃)₂—CH(OH)—C₆H₅ |
| HO—piperidino (HO  H  N—) | H | —C(CH₂OH)₂—C₂H₅ |
| morpholino (O  H  N—) | H | —CH(CH₃)—(CH₂)₂—C₆H₅ |
| Cl | H | —CH(CH₃)—CH₂—C₆H₅ |
| C₆H₅ | H | —CH(C₂H₅)—CH₂—C₆H₅ |
| Br— | H | —CH₂—C₆H₅ |
| C₄H₉— | H | —(CH₂)₂—C₆H₅ |
| CH₂=CH— | H | —CH₂—⟨C₆H₄⟩—OCH₃ |
| piperidino (H N—) | H | —(CH₂)₂—⟨C₆H₃⟩(OCH₃)(OCH₃) |
| piperidino (H N—) | H | —CH(CH₃)—CH(CH₃)—CH₂—⟨C₆H₄⟩—Cl |
| piperazino (H—N  H  N—) | H | —CH(CH₃)—CH₂—⟨C₆H₄⟩—OB |
| thiomorpholino (S  H  N—) | H | —CH(CH₃)—CH₂—⟨C₆H₄⟩—OCH₃ |
| thiomorpholino (S  H  N—) | H | —(CH₂)₃—⟨C₆H₄⟩—CH₃ |
| morpholino (O  H  N—) | H | —CH(CH₃)—(CH₂)₂—⟨C₆H₃⟩(OCH₃)(OCH₃) |
| C₂H₅O— | H | —CH(CH₃)—(CH₂)₂—⟨C₆H₃⟩(CH₃)(CH₃) |
| C₂H₅O— | H | —CH(CH₃)—(CH₂)₂—⟨C₆H₄⟩—OCH₃ |

TABLE—Continued

| R | R⁵ | R⁶ |
|---|---|---|
| Cl | H | —C(CH₃)₂—CH₂—Cl |
| piperidino (H-N⟨⟩) | H | —(CH₂)₃—N(CH₃)₂ |
| HO-piperidino | H | —(CH₂)₂—N(C₂H₅)₂ |
| morpholino (O⟨⟩N—) | H | —CH(CH₃)—(CH₂)₂—N(CH₃)₂ |
| morpholino | H | —(CH₂)₃—N⟨⟩O (morpholino) |
| C₆H₅— | H | —N⟨⟩ with CH₃ (2-methylpyrrolidinyl) |
| morpholino | H | —(CH₂)₃—S—CH₃ |
| C₂H₅— | H | —CH(CH₃)—CH₂—CO₂C₂H₅ |
| C₂H₅— | H | —CH₂—(tetrahydrofuranyl) |
| (CH₃)₂CH— | —CH(CH₃)₂ | —CH(CH₃)₂ |
| (CH₃)₂CH— | —CH₃ | —CH(CH₃)₂ |
| piperidino | —CH(CH₃)₂ | —CH₂—C₆H₅ |
| HO-piperidino | —C₂H₅ | —C₂H₅ |
| morpholino | —C₄H₉ | —C₄H₉ |
| Cl | —CH₃ | —CH₃ |
| Cl | —C₂H₅ | —C₄H₉ |
| morpholino | —C₂H₅ | —(CH₂)₂—O—C₆H₄—Cl |
| CH₂=CH— | —CH₂—C₆H₅ | —CH(CH₃)—C≡CH |
| C₆H₅— | —CH₂C₆H₅ | —CH(CH₃)₂ |
| C₂H₅— | —OCCH₃ | —CH(CH₃)₂ |
| piperidino | (CH₂)₅ | |
| morpholino | (CH₂)₂—O—(CH₂)₂ | |
| piperidino | (CH₂)₄ | |
| HO-piperidino | CH₂—CH=CH—(CH₂)₂ | |
| piperidino | CH=CH—(CH₂)₃ | |
| C₂H₅O— | CH₂—CH=CH—CH=CH | |
| thiomorpholino (S⟨⟩N—) | (CH₂)₂—S—(CH₂)₂ | |
| C₄H₉NH— | H | —C(CH₃)₃ |
| (C₂H₅)₂N— | H | —C(CH₃)₃ |
| [(CH₃)₂CH]₂N— | H | —C(CH₃)₃ |
| (HO—CH₂CH₂)₂N— | H | —C(CH₃)₃ |
| 2-methyl-piperidino | H | —C(CH₃)₃ |
| 4-methyl-piperidino (CH₃-⟨⟩N—) | H | —CH(CH₃)₂ |
| 2-ethyl-piperidino | H | —C(CH₃)₂ |

TABLE—Continued

| R | R⁵ | R⁶ |
|---|---|---|
| 2-(2-hydroxyethyl)piperidin-1-yl | H | —C(CH₃)₃ |
| 2,2-dimethylaziridin-1-yl | H | —CH(CH₃)₂ |
| 2,4-di-n-propylazetidin-1-yl | H | —CH(CH₃)₂ |
| 2,4-di-n-butylazetidin-1-yl | H | —C(CH₃)₃ |
| C₂H₅O— | H | —CH(CH₃)—CH₂—N(morpholino) |
| C₂H₅O— | H | 3-(morpholin-4-yl)pyridin-2-yl |
| C₂H₅O— | H | 3-(morpholin-4-yl)piperidin-2-yl |
| C₆H₅— | H | —CH(CH₃)—CH(C₆H₅)—N(morpholino) |
| C₂H₅— | H | —C(C₃H₇)₂—CH₂—N(morpholino) |
| 4-methylpiperazin-1-yl | H | —CH₂CH₂—N(piperazin-1-yl)NH |
| morpholin-4-yl | H | 2-(piperidin-1-yl)piperidin-3-yl |
| piperidin-1-yl | H | —CH₂CH₂—N(piperidin-1-yl) |
| piperidin-1-yl | H | —CH₂—CH(C₃H₇)—N(piperidin-1-yl) |
| piperidin-1-yl | H | —CH₂CH₂—N(piperidin-1-yl) |
| C₆H₅— | H | 2-(pyrrolidin-1-yl)phenyl |
| morpholin-4-yl | H | —C(CH₃)₂—CH₂—N(CH₃)₂ |

TABLE—Continued

| R | $R^5$ | $R^6$ |
|---|---|---|
| O(morpholino)N— | H | $-CH_2CH_2-N(C_2H_5)_2$ |
| O(morpholino)N— | H | $-CH_2CH_2-N$(morpholino) |

Preparation of the novel products of this invention from the 3-R-4-(3-amino-2-hydroxypropoxy)-1,2,5-thiadiazole is described in the following examples.

EXAMPLE 29

3-chloro-4-(3-isopropylamino-2-hydroxypropoxy)-1,2,5-thiadiazole

The acid chloride, 3 - chloro - 4 - chlorocarbonylmethoxy-1,2,5-thiadiazole, from Example 24, Step A, is treated with potassium cyanide by the usual method to give the cyanoketone, 3 - chloro - 4 - cyanocarbonylmethoxy-1,2,5-thiadiazole. This product then is hydrogenated in the presence of a catalyst such as palladium on charcoal or reduced with lithium aluminum hydride to give 3 - chloro - 4 - (3 - amino - 2 - hydroxypropoxy)-1,2,5-thiadiazole. This amine, when reductively alkylated with acetone affords 3 - chloro - 4 - (3 - isopropylamino-2-hydroxypropoxy)-1,2,5-thiadiazole.

By replacing the cyanoketone and the acetone reactants employed in Example 29 by the products identified in the following table, other 3-R-4-{3-[(CHYZ)NH]-2-hydroxypropoxy}-1,2,5-thiadiazole compounds are obtained wherein the groupings R, X, Y and Z are those given.

TABLE V $$R-\underset{N\diagdown S\diagup N}{\text{thiadiazole}}-X + O=C\diagup^Y_Z \longrightarrow R-\underset{N\diagdown S\diagup N}{\text{thiadiazole}}-O-CH_2-\underset{OH}{CH}-CH_2-NH(CHYZ)$$

| R | X | Y | Z |
|---|---|---|---|
| $C_2H_5$ | $-O-CH_2-\overset{O}{\underset{\|}{C}}-CHN_2$ | $-CH_2-C\equiv CH$ | $CH_3$ |
| O(morpholino) H N— | $-O-CH_2-\overset{O}{\underset{\|}{C}}-CN_3$ | $-CH_3$ | $CH_3$ |
| O(morpholino) H N— | $-O-CH_2-\overset{O}{\underset{\|}{C}}-CH=NOH$ | $-CH_2CH_2OH$ | $CH_3$ |
| O(morpholino) H N— | $-O-CH_2-\overset{O}{\underset{\|}{C}}-CH_2NO_2$ | $-C_6H_{11}$ | $CH_3$ |
| H N— | $-O-CH_2-\underset{OH}{CH}-CH_2NO_2$ | $-C_6H_5$ | $CH_3$ |
| $C_6H_5$ | $-O-CH_2-\underset{OH}{CH}-CN$ | $-C_2H_5$ | $C_2H_5$ |
| $CH_3-N$(piperazino) H N— | $-O-CH_2-\overset{}{\underset{\|\ O}{C}}-CN$ | $(CH_2)_5$ | |

EXAMPLE 30

3-(3-amino-2-hydroxypropoxy)-4-morpholino-1,2,5-thiadiazole

A solution of 5.0 g. of 3-hydroxy-4-morpholino-1,2,5-thiadiazole (26.7 mmole) in 18.95 of 1.41 N methanolic sodium methoxide is treated with 10.5 ml. of epichlorohydrin (134 mmole) and the mixture is stirred at 25° C. for 16 hours. The precipitated sodium chloride is filtered and washed with methanol. The filtrate is evaporated in vacuo to an oil residue. The oil is taken up in 50 mls. of methanol and treated with 5 ml. of concentrated ammonium hydroxide solution. After standing for 48 hours, the solution was concentrated to dryness.

EXAMPLE 31

3-(3-t-butylamino-2-hydroxypropoxy)-4-morpholino-1,2,5-thiadiazole

A solution of 260 g. (1 mole) of 3-(3-amino-2-hydroxypropoxy) - 4 - morpholino - 1,2,5 - thiadiazole from Example 30 in dioxane is treated slowly with (0.4 mole) of t-butyl chloride at 50–60° C. under vigorous stirring. A solution of 23 g. (0.4 mole) of potassium hydroxide in 20–25 ml. water is then added, and the precipitated salt is removed by filtration. The filtrate is concentrated to dryness and the product is purified by recrystallization, to give 3-(3-tert-butylamino-2-hydroxypropoxy)-4-morpholino-1,2,5-thiadiazole.

Employing the method of Example 31 but substituting for the t-butyl chloride, an equivalent amount of (1) isopropyl bromide,
(2) 1,1-dimethylpropyl chloride, or
(3) 2,2-dimethylpropyl bromide there is produced (1) 3 - (3 - isopropylamino - 2 - hydroxypropoxy) - 4-morpholino-1,2,5-thiadiazole,
(2) 3 - [3 - (1,1 - dimethylpropyl)amino - 2 - hydroxypropoxy]-4-morpholino-1,2,5-thiadiazole,
(3) 3 - [3 - (2,2 - dimethylpropyl)amino - 2 - hydroxypropoxy]-4-morpholino-1,2,5-thiadiazole, respectively.

The invention further provides pharmaceutical compositions comprising, as active ingredient, at least one of the compounds according to the invention in association with a pharmaceutical carrier or excipient. The compounds may be presented in a form suitable for oral, rectal or parenteral administration. Thus, for example, compositions for oral administration may be solid or liquid and may take the form of capsules, tablets, coated tablets, suspensions, etc., such compositions comprising carriers or excipient conveniently used in the pharmaceutical art.

Thus suitable tabletting excipients include lactose, potato and maize starches, talc, gelatine, stearic acid, magnesium stearate, polyvinyl pyrrolidone, or other known tabletting substances.

For parenteral administration, the carrier or excipient may be a sterile, parenterally acceptable liquid, e.g., pyrogen-free water or an aqueous solution of polyvinyl pyrrolidone, or a parenterally acceptable oil, e.g., arachis oil, contained in ampoules.

In compositions for rectal administration, the carrier may comprise a suppository base, e.g., cocoa butter or a glyceride.

Advantageously, the compositions may be formulated as dosage units, each unit being adapted to supply a fixed dose of active ingredient. Tablets, coated tablets, capsules, ampoules and suppositories are examples of preferred dosage unit forms according to the invention. Each dosage unit adapted for oral administration may conveniently contain 1 to 20 mg., and preferably 2 to 10 mg., of the active ingredient; each dosage unit adapted for parenteral administration may conveniently contain 0.1 to 5 mg., and preferably 0.1 to 1 mg., of the active ingredient.

In the following examples, pharmaceutical compositions according to the invention are illustrated; other acid addition salts, or other active compounds can be substituted for that named, if so desired.

The pharmaceutical compositions of the following examples contain 3-morpholino-4-(3-tert-butylamino-2-hydroxypropoxy)-1,2,5-thiadiazole hydrochloride as active ingredient.

EXAMPLE 32

An injectable solution is prepared by conventional methods containing:

Active compound—1 mg.
Sodium chloride—9 mg.
Bidist. water, q.s.—1.0 ml.

EXAMPLE 33

Capsules are prepared by conventional methods containing:

Active compound—5 mg.
Magnesium stearate—2.0 mg.
Lactose U.S.P.—19.3 mg.

What is claimed is:
1. A 1,2,5-thiadiazole having the structure

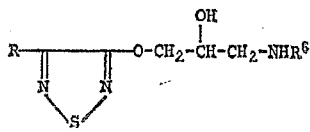

wherein R is selected from the group consisting of hydrogen, chloro, bromo, $C_{1-5}$ alkyl, $C_{2-5}$ mono-alkenyl, $C_{1-5}$ alkoxy, $C_{3-6}$ cycloalkyl, phenyl, phenalkyl, morpholino, furyl, thienyl and pyrryl; and $R^6$ is selected from the group consisting of branched chain $C_{3-6}$ alkyl, hydroxy-branched chain $C_{3-6}$ alkyl, $C_{1-4}$ alkoxy-branched chain $C_{3-6}$ alkyl, and branched chain $C_{3-6}$ mono-alkinyl.

2. A product as claimed in claim 1, wherein $R^6$ is a branched chain $C_{3-6}$ alkyl.

3. A 1,2,5-thiadiazole compound as claimed in claim 1 wherein R is morpholino and $R^6$ is a branched chain $C_{3-6}$ alkyl.

4. 3-morpholino-4-(3 - tert - butylamino - 2 - hydroxypropoxy)-1,2,5-thiadiazole.

5. The (+)-isomer of 3-morpholino-4-(3-tert-butylamino-2-hydroxypropoxy)-1,2,5-thiadiazole.

6. The (—)-isomer of 3-morpholino-4-(3-tert-butylamino-2-hydroxypropoxy)-1,2,5-thiadiazole.

7. A 1,2,5-thiadiazole compound as claimed in claim 1 wherein R is morpholino and $R^6$ is isopropyl.

8. A 1,2,5-thiadiazole compound as claimed in claim 1 wherein R is hydrogen.

9. A 1,2,5-thiadiazole compound as claimed in claim 1 wherein R is hydrogen and $R^6$ is a branched chain $C_{3-6}$ alkyl.

10. A 1,2,5-thiadiazole compound as claimed in claim 1 wherein R is hydrogen and $R^6$ is hydroxy-branched chain $C_{3-6}$ alkyl.

11. A 1,2,5-thiadiazole compound as claimed in claim 1 wherein R is chloro and $R^6$ is a branched chain $C_{3-6}$ alkyl.

12. A 1,2,5-thiadiazole compound as claimed in claim 1 wherein R is chloro and $R^6$ is tert-butyl.

13. The (+)-isomer of a 1,2,5-thiadiazole as claimed in claim 1 wherein R is chloro and $R^6$ is tert-butyl.

14. The (—)-isomer of a 1,2,5-thiadiazole as claimed in claim 1 wherein R is chloro and $R^6$ is tert-butyl.

15. A 1,2,5-thiadiazole compound as claimed in claim 1 wherein R is chloro and $R^6$ is isopropyl.

16. A 1,2,5-thiadiazole compound as claimed in claim 1 wherein R is lower alkyl and $R^6$ is branched chain $C_{3-6}$ alkyl.

17. A 1,2,5-thiadiazole compound as claimed in claim 1 wherein R is ethyl and $R^6$ is isopropyl.

18. A 1,2,5-thiadiazole compound as claimed in claim 1 wherein R is ethyl and $R^6$ is tert-butyl.

19. A 1,2,5-thiadiazole compound as claimed in claim 1 wherein R is $C_{1-5}$ alkoxy and $R^6$ is branched chain $C_{3-6}$ alkyl.

20. A 1,2,5-thiadiazole compound as claimed in claim 1 wherein R is ethoxy and $R^6$ is isopropyl.

21. A 1,2,5-thiadiazole compound as claimed in claim 1 wherein R is ethoxy and $R^6$ is tert-butyl.

22. A 1,2,5-thiadiazole compound as claimed in claim 1 wherein R is $C_{1-5}$ alkoxy and $R^6$ is branched chain $c_{3-6}$ alkinyl.

23. A 1,2,5-thiadiazole compound as claimed in claim 1 wherein R is ethoxy and $R^6$ is 1,1-dimethyl-2-propynyl.

24. A 1,2,5-thiadiazole compound as claimed in claim 1 wherein R is phenyl and $R^6$ is branched chain $C_{3-6}$ alkyl.

25. A 1,2,5-thiadiazole compound as claimed in claim 1 wherein R is phenyl and $R^6$ is isopropyl.

26. A 1,2,5-thiadiazole compound as claimed in claim 1 wherein R is phenyl and $R^6$ is tert-butyl.

No references cited.

ALEX MAZEL, Primary Examiner

J. TOVAR, Assistant Examiner

U.S. Cl. X.R.

260—243 B, 268 H, 293.4, 302 D; 424—248

UNITED STATES PATENT OFFICE
CERTIFICATE OF CORRECTION

Patent No. 3,655,663          Dated April 11, 1972

Inventor(s) Burton K. Wasson

It is certified that error appears in the above-identified patent and that said Letters Patent are hereby corrected as shown below:

Page 1 of 2

In column 1, line 2, correct "2-HYDROXY-PROXY)" to read --2-HYDROXYPROPOXY)--; line 5, immediately following "Canada" add --assignor to Charles E. Frosst and Co.--. In column 5, line 19, immediately preceding the reaction scheme, add --ROUTE I--; at about line 30, in the formula identified as "E", change "$R_6$" to read --$R^6$--; at about line 30, in the formula identified as "D", change the portion reading -O-OH$_2$- to read -O-CH$_2$- and in line 68, change that portion of the formula reading

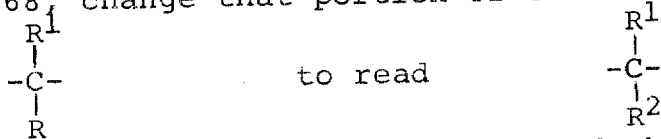

In column 6, line 6, change that portion of the formula reading -NR$^5$R$_6$ to read -NR$^5$R$^6$ in line 13, change "described" to read --desired--; in line 63, in formula I-e, change that portion of the formula reading -NR$^5$R to read -NR$^5$R$^6$
In column 7, at line 24, immediately following the formula, add the identification --I-f--; at line 60, in that part of the formula identified as "a)", correct the spelling of "bromosuccinimide". In column 8, at about line 46, correct the formula reading

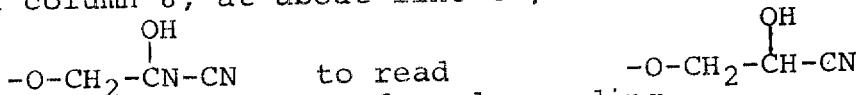

at about line 48, correct the formula reading

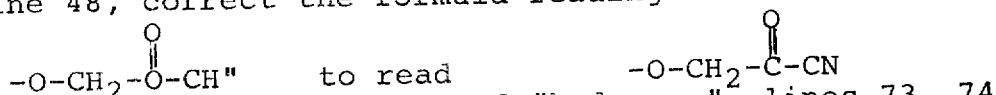

In column 9, line 72, delete the word "hydrogen"; lines 73, 74 and 75, delete in their entirety. In column 10, line 20, change "66.5" to read --166.5--; in the second line of the footnote① at about line 72, change "[α]$^{22}$" to read --[α]$_D^{22°}$--. In column 11, lines 11, 25, and 30, correct the spelling of

R-675.42-H

UNITED STATES PATENT OFFICE
CERTIFICATE OF CORRECTION

Patent No. 3,655,663      Dated April 11, 1972

Inventor(s) Burton K. Wasson

It is certified that error appears in the above-identified patent and that said Letters Patent are hereby corrected as shown below:

Page 2 of 2

"hydroxypropoxy". In columns 13 and 14, in Table I, Example 2, change the empirical formula to read --$C_9H_{17}N_3O_3S$--; in Example 3, change the empirical formula to read --$C_9H_{15}N_3O_3S \cdot HCl$--; and in Example 6, under the Calculated column identified as "C", change "34.63" to read --44.63--. In column 15, line 21, change "morpholine" to read --morpholino--; in line 25, change the Cl value "10.50" to read --10.05--. In column 16, line 56, delete the words "and and follow-"; in line 57, delete this line in its entirety. In column 17, line 23, change "19-4°" to read --192-4°--; also in line 23, following the superscript "20", add a degree sign --°--; in line 30, change "2-hydroxy-2,5-" to read --2-hydroxypropoxy-1,2,5- --. In column 18, in Table II, in Example 20, change the empirical formula to read --$C_{14}H_{26}N_4O_2S \cdot HCl$--. In column 20, line 29, change "(3-butylamino" to read --(3-tert-butylamino--. In column 25, under the column identified as "$R^6$" in the 6th structure from the bottom, change that portion of the structure "OB" to read --OH--. In column 27, under the column identified as "$R^6$" in the last structure, change "$CH_3)_2$" to read --$CH_3)_3$--. In column 31, line 67, immediately following "18.95" add --ml.--.

Signed and sealed this 12th day of September 1972.

(SEAL)
Attest:

EDWARD M. FLETCHER, JR.
Attesting Officer

ROBERT GOTTSCHALK
Commissioner of Patents